United States Patent
Chen et al.

(10) Patent No.: US 10,714,127 B1
(45) Date of Patent: Jul. 14, 2020

(54) SHAPE DESIGNS OF MAGNETIC FLUX GUIDING DEVICES ALL AROUND THE MAIN POLE IN ASSISTED WRITING APPLICATIONS

(71) Applicant: Headway Technologies, Inc., Milpitas, CA (US)

(72) Inventors: Wenyu Chen, San Jose, CA (US); Ying Liu, San Jose, CA (US); Yan Wu, Cupertino, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/451,146

(22) Filed: Jun. 25, 2019

(51) Int. Cl.
*G11B 5/127* (2006.01)
*G11B 5/31* (2006.01)
*G11B 5/133* (2006.01)

(52) U.S. Cl.
CPC .......... *G11B 5/1278* (2013.01); *G11B 5/1335* (2013.01); *G11B 5/312* (2013.01); *G11B 5/3116* (2013.01); *G11B 5/3133* (2013.01)

(58) Field of Classification Search
CPC ... G11B 5/1278; G11B 5/1335; G11B 5/3116; G11B 5/312; G11B 5/3133
USPC ........................................ 360/125.01–125.05
See application file for complete search history.

(56) References Cited

U.S. PATENT DOCUMENTS

| | | | |
|---|---|---|---|
| 5,998,009 A * | 12/1999 | Kurihara | G11B 5/7013 428/323 |
| 6,785,092 B2 | 8/2004 | Covington et al. | |
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |

(Continued)

FOREIGN PATENT DOCUMENTS

| | | |
|---|---|---|
| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., Notification dated Nov. 28, 2012, 11 pages.

(Continued)

*Primary Examiner* — Allen T Cao

(74) *Attorney, Agent, or Firm* — Saile Ackerman LLC; Stephen B. Ackerman

(57) ABSTRACT

A perpendicular magnetic recording writer has a main pole (MP) with a first flux guiding (FG) device in a write gap between the MP trailing side and a trailing shield, and a second FG device in the leading gap (LG) and each side gap (SG). The SG angle is reduced to 15° to 45° to enable conformal and more uniform FG device layers to be formed in the SG and LG. As a result, the MP shape and write field are more reproducible. To compensate for a thinner MP thickness at the air bearing surface that results from maintaining the track width at a shallower SG angle, an upper MP tip may be formed on the lower MP tip thereby generating a hexagonal shape for the combined MP tip. In this case, the second FG device conforms to the shape of the two upper MP tip sides and trailing side.

12 Claims, 15 Drawing Sheets

(56) References Cited

U.S. PATENT DOCUMENTS

| | | |
|---|---|---|
| 7,835,111 B2 | 11/2010 | Flint et al. |
| 7,957,098 B2 | 6/2011 | Yamada et al. |
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,604,886 B2 | 12/2013 | Nikonov et al. |
| 8,634,163 B2 | 1/2014 | Tanabe et al. |
| 8,730,617 B1 | 5/2014 | Hsiao et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,142,228 B2 | 9/2015 | Fujita et al. |
| 9,202,484 B1 | 12/2015 | Watanabe et al. |
| 9,202,528 B2 | 12/2015 | Furukawa et al. |
| 9,230,571 B1 | 1/2016 | Chen et al. |
| 9,299,367 B1 | 3/2016 | Tang et al. |
| 9,361,912 B1 | 6/2016 | Liu et al. |
| 9,406,316 B2 | 8/2016 | Urakami et al. |
| 9,406,317 B1 | 8/2016 | Tang et al. |
| 9,466,319 B1 | 10/2016 | Tang et al. |
| 9,792,933 B2 | 10/2017 | Koizumi et al. |
| 9,824,701 B2 | 11/2017 | Tang et al. |
| 9,934,797 B2 | 4/2018 | Takahashi et al. |
| 9,966,091 B1 | 5/2018 | Chen et al. |
| 10,032,469 B2 | 7/2018 | Lim et al. |
| 10,032,470 B1 | 7/2018 | Degawa et al. |
| 10,037,772 B2 | 7/2018 | Okamura et al. |
| 10,181,334 B1 | 1/2019 | Song et al. |
| 10,325,618 B1 * | 6/2019 | Wu .................... G11B 5/11 |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2012/0292723 A1 | 11/2012 | Luo et al. |
| 2014/0071562 A1 | 3/2014 | Chen et al. |
| 2014/0177092 A1 | 6/2014 | Katada et al. |
| 2015/0043106 A1 | 2/2015 | Yamada et al. |
| 2016/0218728 A1 | 7/2016 | Zhu |
| 2017/0092304 A1 | 3/2017 | Kozumi et al. |
| 2017/0133044 A1 | 5/2017 | Lim et al. |
| 2018/0075868 A1 | 3/2018 | Koui et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

* cited by examiner

SHAPE DESIGNS OF MAGNETIC FLUX GUIDING DEVICES ALL AROUND THE MAIN POLE IN ASSISTED WRITING APPLICATIONS

RELATED PATENT APPLICATIONS

This application is related to the following: filed on Jul. 17, 2018, Ser. No. 16/037,197 and issued as U.S. Pat. No. 10,325,618; filed on Nov. 21, 2018, Ser. No. 16/197,586 and issued as U.S. Pat. No. 10,424,326; filed on Apr. 2, 2019, Ser. No. 16/372,517; and filed on Jun. 25, 2019, Ser. No. 16/451,137; assigned to a common assignee and herein incorporated by reference in their entirety.

TECHNICAL FIELD

The present disclosure relates to a perpendicular magnetic recording (PMR) writer wherein a first magnetic flux guiding (FG) device is inserted in the write gap (WG) and on a main pole (MP) trailing side, and a second FG device is in the side gaps (SG) and leading gap (LG) adjoining the MP sides and MP leading side, respectively, to enhance the write field from the MP tip at the air bearing surface (ABS), and the inner side of each side shield forms a shallower angle with the leading shield top surface than in conventional designs to enable a more controllable MP shape and more uniform second FG device layers, and wherein the MP may have a convex shaped trailing side so that the resulting hexagonal shape of the MP tip maintains substantially the same volume and write field as in conventional trapezoid shapes.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. One approach that is currently being investigated is microwave assisted magnetic recording (MAMR), which is described by J-G. Zhu et al. in "Microwave Assisted Magnetic Recording", IEEE Trans. Magn., vol. 44, pp. 125-131 (2008). Although MAMR has been in development for a number of years, it is not shown enough promise to be introduced into any products yet. In particular, a difficult challenge is to find a spin torque oscillator (STO) film that is thin enough to fit into the small write gap required for state of the art products while providing a high magnetic moment in the oscillation layer to generate a sufficient radio-frequency field on a magnetic medium bit for the assist effect.

STO devices are based on a spin-torque-transfer effect that arises from the spin dependent electron transport properties of ferromagnetic (FM1)-spacer-ferromagnetic (FM2) multilayers. When spin polarized current from the FM1 layer passes through the spacer and FM2 layer in a current perpendicular-to-plane direction, the spin angular moment of electrons incident on the FM2 layer interacts with magnetic moments of the FM2 layer near the interface between the FM2 layer and the non-magnetic spacer. Through this interaction, the electrons transfer a portion of their angular momentum to the FM2 layer. As a result, spin-polarized current can switch (flip) the FM2 magnetization direction if the current density is sufficiently high. STO devices may have FM layers with perpendicular magnetic anisotropy (PMA) where magnetization is aligned substantially perpendicular to the plane of the FM layer. However, unlike Magnetoresistive Random Access Memory (MRAM) where PMA is necessary to keep magnetization perpendicular to plane in a free layer and reference layer, for example, STO in MAMR and related applications has a sufficiently strong gap fields to align magnetization in magnetic layers in the gaps without requiring inherent PMA in the FM1 and FM2 layers.

In a PMR writer, the main pole generates a large local magnetic field to change the magnetization direction of the medium in proximity to the writer. By switching the direction of the field using a switching current that drives the writer, one can write a plurality of media bits on a magnetic recording medium. Magnetic flux in the main pole proceeds through the ABS and into a medium bit layer and soft underlayer (SUL). In related HT18-031, we disclosed a FG device that is one form of a STO. A flux guiding layer (FGL) is FM2 in the aforementioned FM1/spacer/FM2 multilayer, and has a magnetization that is flipped to the opposite direction when current is applied between the MP and trailing shield (TS) and across a spin polarization (SP) layer (FM1) thereby generating spin torque on the FGL. As a result, there is increased reluctance in the write gap so that more magnetic flux from the MP will be concentrated in a direction orthogonal to the ABS to assist writing. Depending on the precessional angle of the flipped FGL magnetization, the MAMR effect may be absent. Optionally, a FGL may also be formed in the side gaps and leading gap to prevent magnetic flux from leaking from the MP to the side shields and leading shield, respectively.

One of the concerns with current FG devices is film roughness (non-uniformity) of each FG device layer that is formed on the inner side shield (SS) sides in the SG and on the leading shield (LS) top surface in the LG. In particular, the side gap angle formed between each inner SS side and the LS top surface is typically >60 degrees and results in a steep slope on which to deposit FG device layers. Accordingly, it is difficult for current deposition processes to provide substantially uniform FG device layers including the FGL. Since FGL thickness can vary from one device to another and even within each FG device, performance reproducibility in terms of the current density required to flip the FGL magnetization has an unacceptable variation that degrades FG device performance. Moreover, the FG device surface on which the MP is subsequently deposited has a tendency to have a non-controllable shape so that many important PMR writer parameters such as MP width, and MP pole tip thickness become more difficult to control. Therefore, an improved PMR writer design is needed to enable a more reproducible PMR writer performance that is related to a tighter control of MP parameters and FG device film uniformity.

SUMMARY

One objective of the present disclosure is to provide a PMR writer wherein FG devices are formed surrounding the MP tip at the ABS, and the FG device formed in the LG and each SG has more uniform layers to provide a more controllable MP shape and more reproducible FG device performance.

A second objective of the present disclosure is to provide the PMR writer according to the first objective wherein down-track performance with a stronger write field and improved field gradient is achieved without compromising cross-track performance.

A third objective is to provide a method of forming the FG devices around the MP in the PMR writer according to the first and second objectives.

According to one embodiment of the present disclosure, these objectives are achieved with a first FG device that is formed in the WG, and a second FG device in the SG and LG, and where each FG device is a stack of layers that comprises a spin polarization (SP) layer adjoining the MP, a first non-magnetic layer (NML1) adjoining the SP layer, a FGL adjoining a side of NML1 that is opposite to the SP layer, and a second non-magnetic layer (NML2) contacting the FGL. Thus, each FG device has a SP/NML1/FGL/NML2 configuration with an inner SP layer and an outer NML2 where "inner" is defined as a FG device layer closest to the MP, and "outer" is a FG device layer that is farthest from the MP.

In the absence of an applied current, the FGL in the first FG device has a magnetization that is substantially in the same direction as the write gap field flux ($H_{WG}$) while the FGL in the second FG device has a magnetization in side and center portions substantially in the same direction as field flux in the SG and LG ($H_{SG}$ and $H_{LG}$), respectively. When a current is applied from the MP and across the first FG device to the TS, and across the second FG device to the SS and LS, the current is spin polarized by the SP layer in each FG device and applies a spin torque on the adjacent FGL. Accordingly, FGL magnetization in the first FG device flips to a direction substantially opposing $H_{WG}$, and FGL magnetization in the side and center portions of the second FG device flips to a direction substantially opposing $H_{SG}$ and $H_{LG}$, respectively, thereby enhancing the write field from the MP to an adjacent magnetic medium. In other embodiments, one or both of the LS and SS may be replaced with a non-magnetic conducting layer.

One key feature is that the inner side of each side shield (SS) forms a shallower gap angle with the leading shield (LS) top surface than in conventional PM writers. In existing designs, the gap angle in the MP (pole) tip is normally greater than 60 degrees, but in preferred embodiments of the present disclosure, the gap angle is between 15 degrees and 45 degrees to enable more uniform FG device films to be deposited on the inner SS sides and LS top surface. In addition, a more tightly controlled uniformity in the second FG device layers allows a more reproducible MP shape including down-track (DT) thickness and cross-track width. In some embodiments, the MP trailing side is a planar surface and the shallower gap angle causes a smaller DT thickness when track width (TW) is maintained compared with MP designs having a gap angle >60 degrees. Thus, the MP retains a trapezoidal shape with two sloped sides connecting the MP trailing side with a shorter MP leading side. The MP trailing side is typically larger than the MP sides, and the MP leading side is considerably smaller in cross-track width compared with conventional designs. Although MP shape and write performance are more reproducible than with MP schemes where the gap angle is >60 degrees, write field magnitude is reduced because of a thinner MP tip.

In order to compensate for a reduced write field when a shallower gap angle is employed in a trapezoid MP shape, MP volume in the pole tip is increased in a second embodiment by adding an upper MP tip with an inverted trapezoid shape on the MP trapezoid shape of the first embodiment. In so doing, a MP tip having an irregular hexagon shape is formed where the four longer sides connected to a first plane that separates the upper and lower MP tip portions are longer than the two shorter sides (MP trailing and leading sides) formed parallel to the first plane. Accordingly, a middle section of top surface in the upper MP tip is the MP trailing side, and two upper MP tip sides connect the MP trailing side to two MP corners at the first plane while two lower MP tip sides connect the MP leading side to the two upper MP tip sides at the MP corners. The shape of the second FG device is retained from the first embodiment. However, the layers in the first FG device are no longer planar but conform to the shape of the MP trailing side and two upper MP tip sides. The sides of the first and second FG devices converge to a point at or proximate to each MP corner.

Each SP layer and FGL is preferably a single layer or multilayer comprised of $Ni_xFe_{100-x}$, $Co_yFe_{100-y}$, $Co_zNi_{100-z}$, or alloys thereof with B, for example, and where x, y, and z are between 0 and 100 atomic %. In other embodiments, one or both of the SP layer and FGL in each FG device is a laminate that is one of $(Co/Ni)_n$, $(CoFe/Ni)_n$, $(Fe/Pt)_n$, and $(Fe/Pd)_n$ where n is a lamination number. NML1 is a spin preserving layer that is one of Cu, Ag, Au, Cr, and Al. NML2 is generally a non-spin preserving layer that is one of Ta, Ru, W, Pt, or Ti.

According to another embodiment, each FG device has a NML2/FGL/NML1/SP configuration where the SP layer is the outer layer and NML2 is the inner layer that contacts the MP tip. In this case, current is applied from the SS and LS across the second FG device to the lower MP tip, and from the TS across the first FG device to the upper MP tip. Again, the SP layer spin polarizes the current and applies a spin torque on the FGL that flips FGL magnetization to a direction substantially opposing $H_{WG}$, $H_{SG}$, and $H_{LG}$ in the respective gaps. The same advantages are achieved compared with the first embodiment but with an additional benefit of a higher write field because of greater MP tip volume.

A method of forming a PMR writer according to the first embodiment is also provided. An opening is formed by a conventional sequence of steps in a SS layer that exposes a LS top surface. Each inner SS side forms an angle from 15 degrees to 45 degrees with respect to the LS top surface. The second stack of FG device layers is deposited to partially fill the opening and then the lower MP tip is deposited on the second FG device stack to fill the opening. A planarization step may be used to form a lower MP tip top surface that is coplanar with a top surface of the second FG device stack. Sides are formed on second FG device stack with an ion beam etch (IBE), and extend from a MP corner at each end of the lower MP tip top surface to a top surface of a side shield. Then, a gap layer is deposited that contacts the second FG device sides. An upper MP tip is deposited on the lower MP tip and is patterned to form two upper MP tip sides that each connect with a lower MP tip side at a MP corner, and a MP trailing side between the two upper MP tip sides. The first FG device stack of layers is deposited on the upper MP tip, and is patterned to form two sides thereon where each first FG device side has a bottom end proximate to a top end of a second FG device side at a MP corner. After a write gap layer is deposited on the gap layer and adjoins the first FG device sides, a trailing shield structure is formed on the first FG device and on portions of the side shields. Thereafter, a conventional sequence of steps is then followed to complete the PMR writer structure.

DETAILED DESCRIPTION

Figure 1:
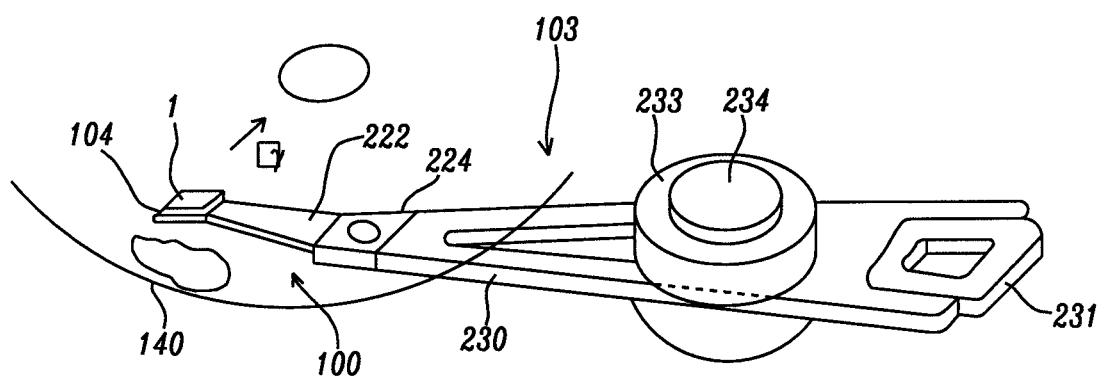
FIG. 1 is a perspective view of a head arm assembly of the present disclosure.

The present disclosure is a PMR writer structure wherein a first magnetic flux guiding (FG) device having a first FGL is formed in the WG, and a second FG device with a second FGL is formed in the SG and LG to increase reluctance in the gaps when each FGL magnetization is flipped to a direction substantially opposing the respective gap field flux thereby forcing more magnetic flux from the MP tip at the ABS to enhance the write field, and improve the down-track field gradient and BER. In the drawings, the y-axis is in a cross-track direction, the z-axis is in a down-track direction, and the x-axis is in a direction orthogonal to the ABS and towards a back end of the PMR writer. Thickness refers to a down-track distance, width is a cross-track distance, and height is a distance from the ABS in the x-axis direction. The terms flipping and switching may be used interchangeably when referring to a FGL magnetization. In each FG device, the inner layer is the layer closest to the MP tip and the outer layer is the layer farthest from the MP tip. A backside of a layer faces away from the ABS, and a front side faces the ABS.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
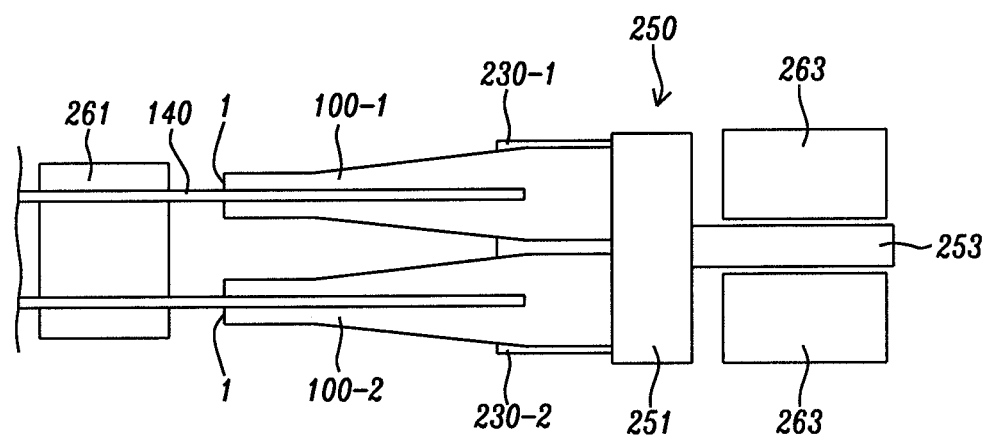
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
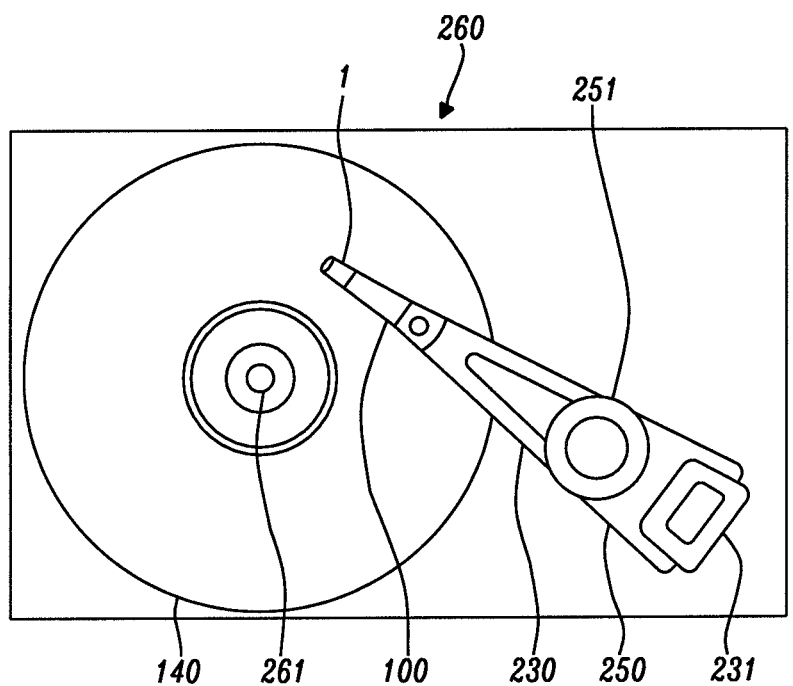
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
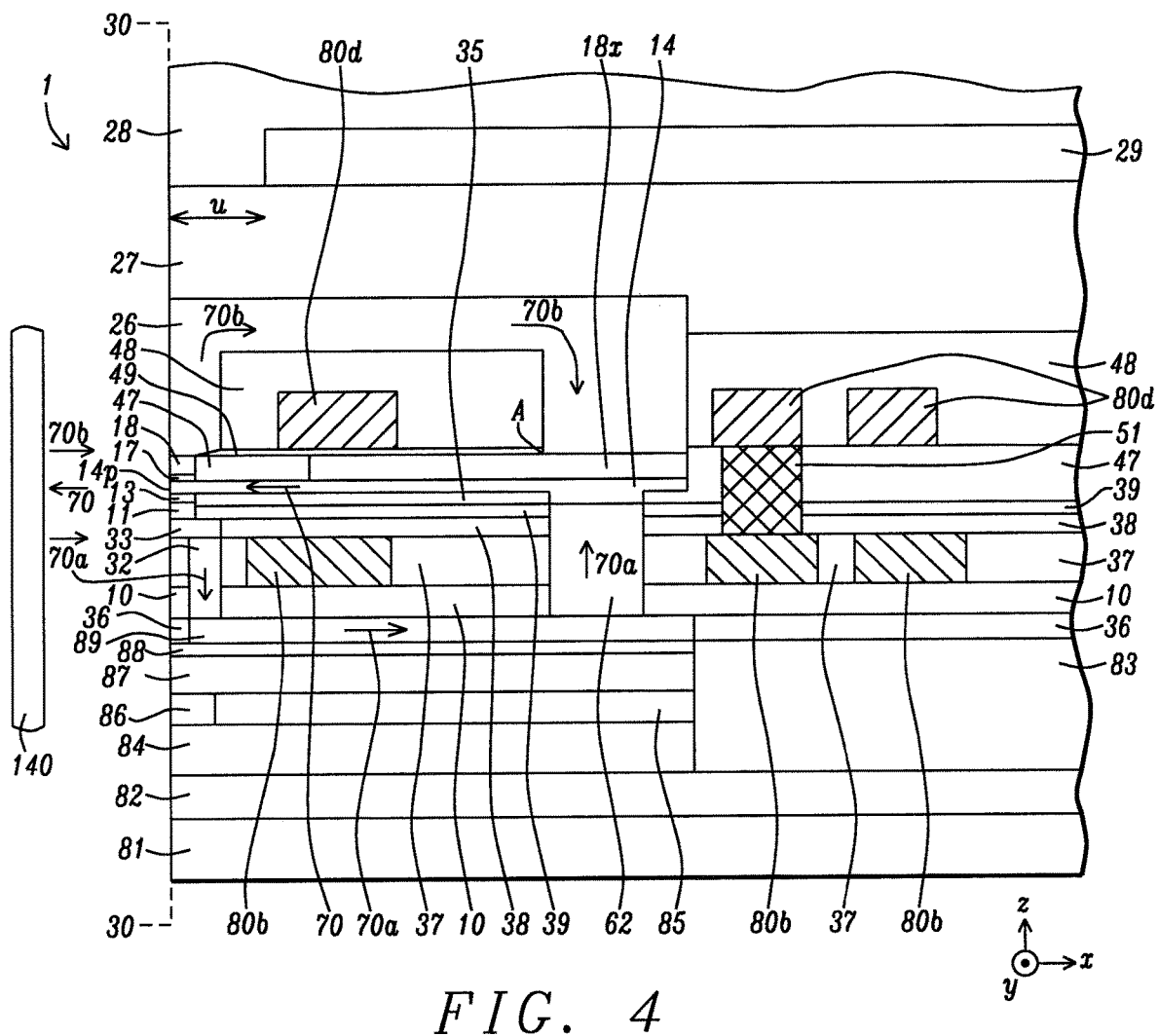
FIG. 4 is a down-track cross-sectional view of a combined read-write head with leading and trailing loop pathways for magnetic flux return to the main pole according to an embodiment of the present disclosure.

Referring to FIG. 4, magnetic recording head 1 comprises a combined read-write head. The down-track cross-sectional view is taken along a center plane (not shown) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) 14 is generated with flowing a current through bucking coil 80b and driving coil 80d that are below and above the MP, respectively, and are connected by interconnect 51. Magnetic flux 70 exits the MP tip 14p at the ABS 30-30 and is used to write a plurality of bits on magnetic medium 140. Magnetic flux 70b returns to the MP through a trailing loop comprised of trailing shields 17, 18, PP3 shield 26, and top yoke 18x. The leading return loop for magnetic flux 70a includes leading shield 11, leading shield connector (LSC) 33, S2 connector (S2C) 32, return path 89, and back gap connection (BGC) 62. The magnetic core may also comprise a bottom yoke 35 below the MP. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS is an optional cover layer 29 that is preferably comprised of a low coefficient of thermal expansion (CTE) material such as SiC. Overcoat layer 28 is the uppermost layer in the write head.

Figure 5A:
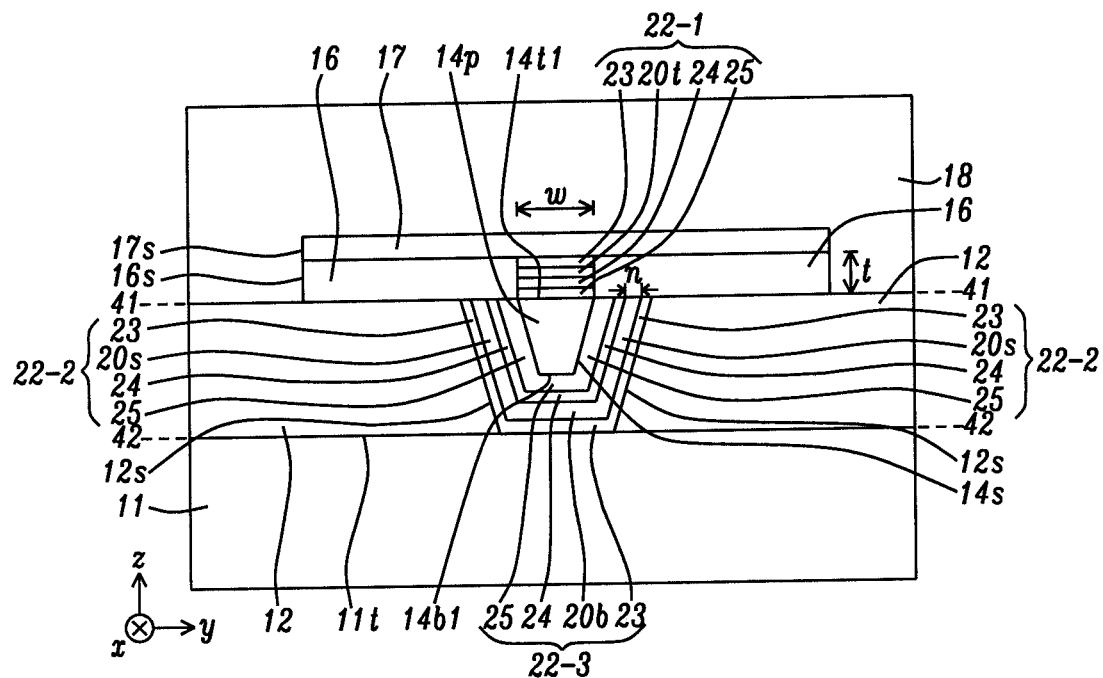
FIG. 5A is an ABS view of an all wrap around (AWA) shield structure surrounding a main pole (MP), and with a FG device in each of the gaps around the MP according to a process of record (POR) design known to the inventors.

Referring to FIG. 5A, a main pole (MP) with MP tip 14p having track width w, trailing side 14t1, leading side 14b1, and two sides 14s connecting the leading and trailing sides is shown with an all wrap around (AWA) shield structure that was disclosed in related Pat. No. 10,325,618. There is a WG 16 with thickness t on the MP trailing side, side gaps (SG) 15 of width n adjoining each MP side, and a leading gap (LG) 13 below the MP leading side. The trailing shield structure comprises a first trailing shield (TS) 17 with a high magnetic saturation value from 19 kiloGauss (kG) to 24 kG on the write gap. The trailing shield structure also includes a second TS 18 also known as the write shield formed on the first TS top surface 17t and sides 17s, on WG sides 16s, and on a top surface of the side shields 12 at plane 41-41. Plane 41-41 includes the MP trailing side at the ABS. Side shields contact a top surface of the leading shield 11 at plane 42-42 that is parallel to plane 41-41 and includes the MP leading side at the ABS.

A first FG device 22-1 also known as $FG_{WG}$ is formed in the WG and has a SP/NML1/FGL/NML2 configuration where SP layer 25, NML1 24, FGL 20t, and NML2 23 are sequentially formed on MP trailing side 14t1, and first TS 17 contacts a top surface of NML2. In addition, there is a second FG device 22-2 also called $FG_{SG}$ formed in each SG with an inner SP layer 25, an outer NML2 23 that adjoins SS side 12s, and with a FGL 20s between NML1 24 and NML2. A third FG device 22-3 also known as $FG_{LG}$ with a SP/NML1/FGL/NML2 configuration is formed in the LG and has an inner SP layer 25, an outer NML2 23 that adjoins LS top surface 11t, and a FGL 20b between NML1 24 and NML2.

Figure 5B:
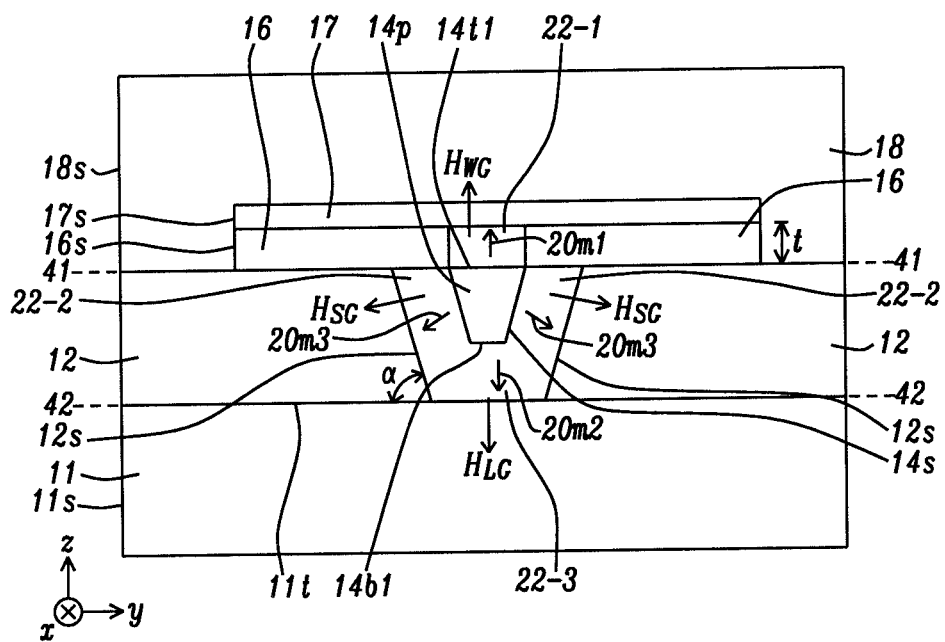
FIG. 5B shows how a FGL magnetization in each of the FG devices in FIG. 5A is aligned with a flux field in each of the gaps in the absence of an applied current.

FIG. 5B shows that in the absence of applied current, FGL 20t in FIG. 5A has a magnetization 20m1 that is in the direction of $H_{WG}$ while FGL 20b and FGL 20s have magnetizations 20m2 and 20m3, respectively, that are in the direction of $H_{LG}$ and $H_{SG}$, respectively. As described in related U.S. Pat. No. 10,325,618, when a current $I_b$ (not shown) of sufficient current density is applied from MP tip 14p and across FG device 22-1 to first TS 17, and across FG device 22-3 to LS 11 and across FG devices 22-2 to SS 12, then FGL magnetizations 20m1, 20m2, and 20m3 flip to a direction substantially opposing $H_{WG}$, $H_{LG}$, and $H_{SG}$, respectively, as a result of spin torque exerted on each FGL from an adjacent SP layer 25. Accordingly, the write field (not shown) from MP tip 14p is enhanced and a smaller write current is required to generate a write field that switches a magnetization in one or more magnetic bits in a magnetic medium.

However, we have found that the side gap angle α (typically >60 degrees) formed by the intersection of SS side 12s and LS top surface 11t is a steep slope that tends to cause unacceptable non-uniformity in the thickness of all layers in FG devices 22-2 and 22-3. The resulting shape of the MP tip 14p is also irregular at times because MP sides 14s and MP leading side 14b1 are non-planar if the FG device layers are not uniform. Thus, write performance from one PMR writer to the next is likely to be not reproducible if FGL film thickness, for example, is not adequately controlled.

Figure 6A:
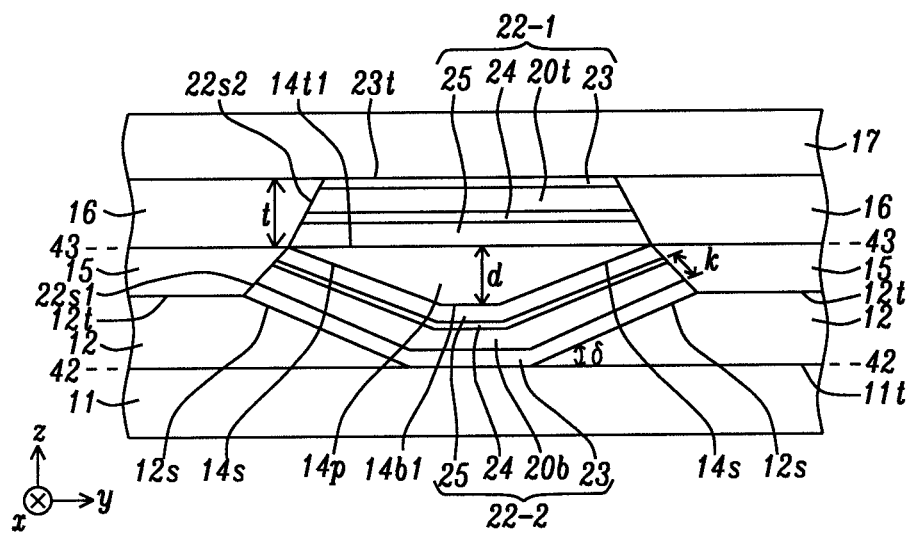
FIG. 6A is an ABS view of a PMR writer structure where the angle formed between the inner SS sides and LS top surface is substantially less than in the POR design, and a first FG device is in the WG and a second FG device is in the SG and LG according to a first embodiment of the present disclosure.

Referring to FIG. 6A, a first embodiment of the present disclosure is depicted from an ABS view and features a first FG device 22-1 formed in the WG 16 and between the MP trailing side 14t1 and first TS 17, and a second FG device 22-2 formed on the LS top surface 11t within the LG, and on SS inner sides 12s within each SG (not shown). Gap layer 15 adjoins each side 22s1 of the second FG device and contacts a bottom surface of the WG at plane 43-43. Each FG device has a stack of layers with an inner SP layer 25, and NML1 24, FGL 20t or FGL 20b, and NML2 23 sequentially formed on the inner SP layer. Note that each of the layers in FG device 22-2 is conformal to the shape of SS sides 12s and LS top surface 11t and is a continuous film with a substantially uniform thickness that is enabled by a shallow side gap angle δ preferably between 15 degrees and 45 degrees. Side gap angle δ is defined as the angle between each SS inner side and plane 42-42 that comprises the LS top surface and each SS bottom surface. Thus, FGL 20b has a uniform thickness k from one side 22s1 of the FG device to the opposite side 22s1 where each of the aforementioned sides adjoins gap layer 15 that contacts SS top surface 12t. Gap layer 15 has a top surface at plane 43-43 that comprises MP top surface 14t1 and is parallel to plane 42-42 that includes LS top surface 11t. FG device 22-1 has sides 22s2 that adjoin WG 16, and has thickness t. First TS 17 is formed on the WG and on top surface 23t of FG device 22-1. A backside of each FG device may be a throat height (TH) behind the ABS, but in other embodiments may have a height less than TH.

The present disclosure also anticipates that one or both of LS 11 and SS 12 may be replaced with non-magnetic conductive (NMC) layers that are preferably one or more of Ru, Cr, Pd, Pt, Ti, W, and Ta as described in related patent application Ser. No. 16/451,137. NMC layers provide one or more benefits such as improved resistance to wear during repeated touchdowns, better resistance to corrosion, and a different thermal expansion coefficient for more flexibility in adjusting WG protrusion compared with FeCo, FeCoN, FeCoNi, and NiFe that are typically used as SS and LS materials.

Each of SP layer 25, and FGL 20t and 20b in FG devices 22-1 and 22-2, respectively, is preferably a single layer or multilayer comprised of one or more of $Ni_xFe_{100-x}$, $Co_yFe_{100-y}$, $Co_zNi_{100-z}$, or alloys thereof with B, for example, where each of x, y, and z is from 0 to 100 atomic %, or is a laminate such as $(Co/Ni)_n$, $(CoFe/Ni)_n$, $(Fe/Pt)_n$, and $(Fe/Pd)_n$ where n is a lamination number. NML1 is a spin preserving layer (SPL) that is one of Cu, Ag, Au, Cr, and Al. NML2 is a non-spin preserving layer that is one of Ta, Ru, W, Pt, or Ti. Optionally, NML2 in FG device 22-2 may be omitted when the LS and SS are replaced with NMC layers, and the adjoining NMC layers are also made of a non-spin preserving material.

Figure 6B:
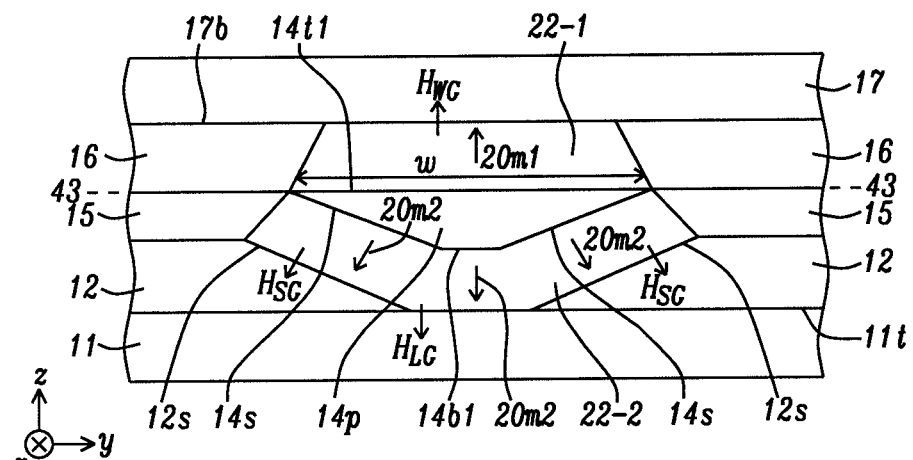
FIG. 6B is an ABS view of the PMR writer structure in FIG. 6A showing a FGL magnetization in each FG device in the absence of an applied current.

Referring to FIG. 6B, individual layers in each FG device are not shown in order to more clearly depict gap flux fields $H_{WG}$, $H_{SG}$, and $H_{LG}$, and to show that FGL 20t has magnetization 20m1 substantially parallel to $H_{WG}$ in the absence of an applied current across FG device 22-1, and FGL 20b proximate to SS 12 has magnetization 20m2 substantially parallel to $H_{SG}$ while FGL 20b proximate to LS 11 has a magnetization 20m2 parallel to $H_{LG}$ in the absence of an applied current across FG device 22-2. MP width w is typically from 25 nm to 80 nm while MP thickness d is at least 10 nm, and preferably ≥20 nm.

Figure 6C:
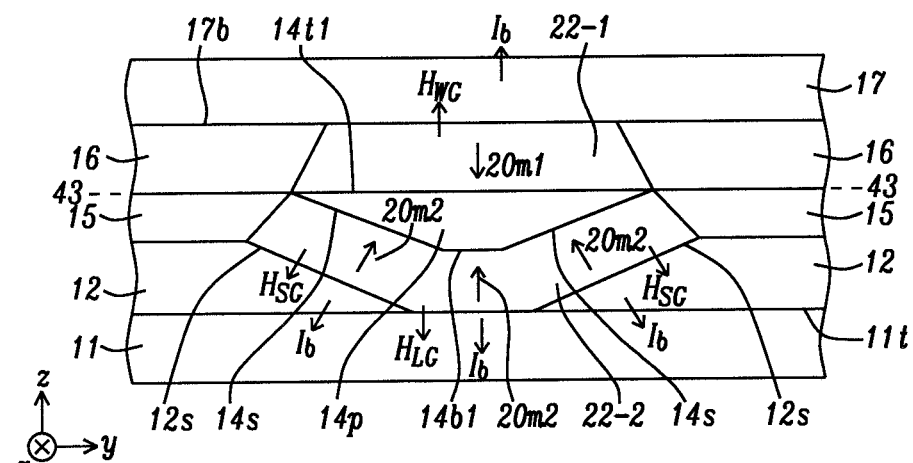
FIG. 6C shows the FGL magnetization in each FG device is switched after a current is applied across gaps from the MP to the surrounding shields.

As shown in FIG. 6C, when a current $I_b$ of sufficient current density, preferably in a range of $1 \times 10^{-7}$ to $1 \lambda 10^{-9}$ Amp/cm$^2$, is applied from MP tip 14p across FG device 22-1 to first TS 17, and from the MP tip across FG device 22-2 to SS 12 and LS 11, then magnetization 20m1 flips to a direction substantially opposing $H_{WG}$, and magnetization 20m2 flips to a direction substantially opposing $H_{SG}$ and $H_{LG}$ as a result of spin torque from SP layer 25 that is applied to FGL 20t and FGL 20b, respectively. It should be understood that each of the aforementioned magnetizations after flipping has a precessional state (oscillation) described in related U.S. Pat. No. 10,424,326, and depending on the cone angle of the oscillation, the FG device may provide both of an increased reluctance in the gaps to enhance the write field, and generate a radio frequency (RF) field on the magnetic medium to provide a microwave assisted magnetic recording (MAMR) effect by lowering the write field required to switch one or more magnetic bits. As current $I_b$ increases, the cone angle decreases and approaches 0 degrees (orthogonal to MP trailing side 14t1 and to MP sides 14s, and orthogonal to MP leading side 14b1) to provide a maximum boost to the write field, but where the MAMR effect is effectively absent.

The present disclosure also encompasses other embodiments relating to FG device structures. For example, related U.S. Pat. No. 10,424,326 discloses that a second SP layer (in a synthetic antiferromagnetic or SAF configuration) may be included on an opposite side of the FGL in each FG device with respect to the first SP layer for the benefit of reducing the $I_b$ current density needed to flip the FGL magnetization. In other embodiments, the SP layer 25 in FG device 22-1 may be omitted and a portion of the MP tip proximate to MP trailing side 14t1 may spin polarize the current $I_b$ in the WG to apply spin torque to FGL 20t. Also, SP layer 25 in FG device 22-2 may be omitted and a portion of the MP tip proximate to MP leading side 14b1 and to MP sides 14s may spin polarize $I_b$ in the LG and SS, respectively, to apply spin torque to FGL 20b. Related patent application Ser. No. 16/372,517 describes alternative embodiments where each of the FG devices may be recessed from the ABS to reduce wear while still providing performance advantages. Meanwhile, the advantages such as improved down-track field gradient and better BER that are realized with FG devices in the related patent applications, are also achieved in the PMR writer of the present disclosure.

Figure 7A:
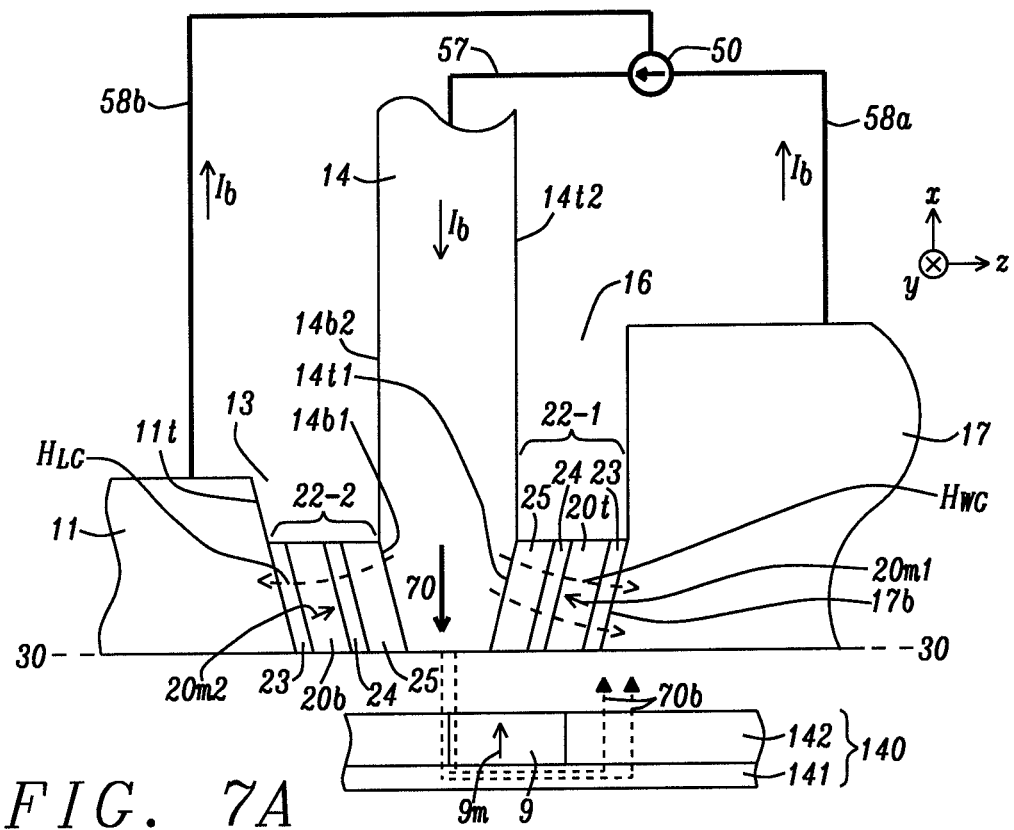
FIG. 7A is a down-track cross-sectional view of the PMR writer structure in FIG. 6C at a center plane that bisects the MP trailing and leading sides, and where each of the MP trailing side and leading side at the ABS is tapered.

According to the exemplary embodiment in FIG. 7A, which is a down-track cross-sectional view of the PMR writer structure in FIGS. 6A-6C, MP 14 may have a tapered leading side 14b1 adjoining FG device 22-2, and a tapered trailing side 14t1 contacting FG device 22-1. The tapered leading side connects with MP bottom surface 14b2 proximate to a backside of FG device 22-2, and the tapered trailing side connects with MP top surface 14t2 proximate to a backside of FG device 22-1. Current $I_b$ is applied from source 50 through lead 57 to MP 14 and across FG device 22-1 through TS bottom surface 17b, and returns from first TS 17 to the source through lead 58a. Current $I_b$ is also applied across FG device 22-2 and through LS top surface 11t, and returns from LS 11 to the source through lead 58b. Leads from the SS to the source, and FGL magnetization 20m2 in the portion of FG device 22-2 that adjoins SS 12 are not shown from this perspective. As a result, FGL magnetization 20m1 switches to a direction opposing $H_{WG}$ and FGL magnetization 20m2 switches to a direction opposing $H_{LG}$ thereby enhancing MP write field 70. The write field exits through ABS 30-30 and switches magnetization 9m in bit 9 in magnetic medium 140. Return field 70b is shown entering the first TS. The magnetic medium comprises magnetic recording layer 142 on soft underlayer 141. Because of the improved uniformity in FG device layers compared with prior art schemes, the current density required to flip the FGL magnetizations is more reproducible from one PMR writer to the next. Moreover, the MP write field is more reproducible since the MP shape and volume are more tightly controlled.

Figure 7B:
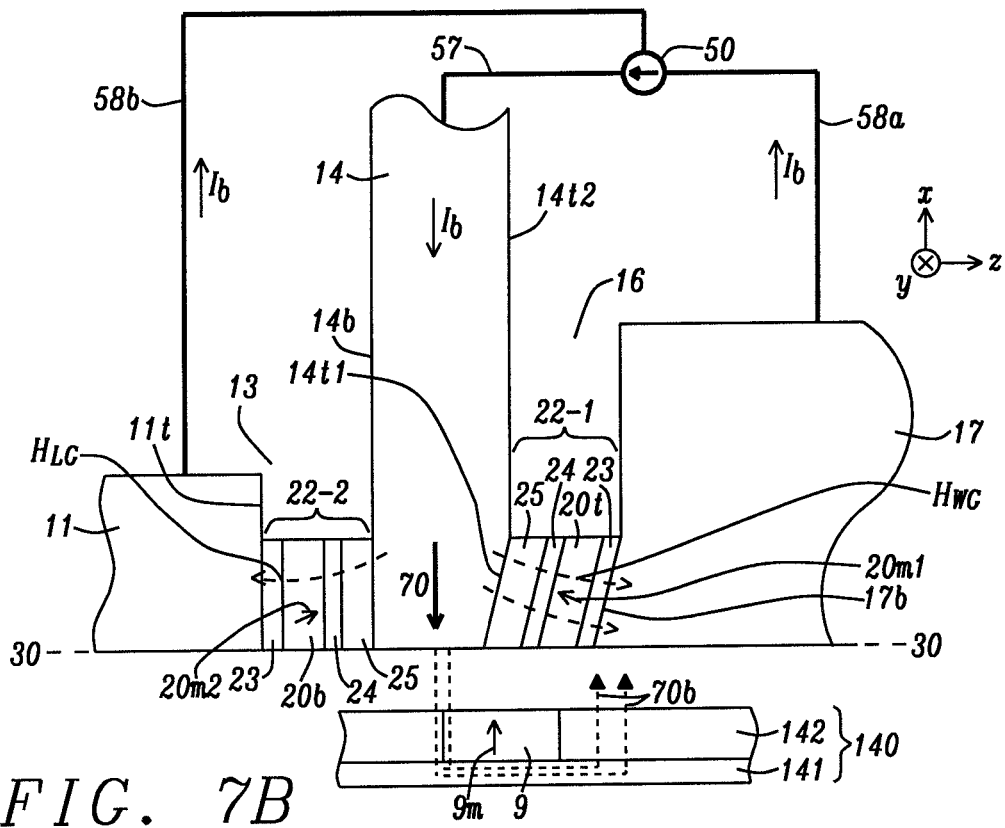
FIG. 7B is an alternative embodiment to the PMR writer structure in FIG. 7A wherein the MP leading side is orthogonal to the ABS while the MP trailing side at the ABS is tapered.

An alternative embodiment shown in FIG. 7B retains all the features of the PMR writer structure in FIG. 7A except the MP leading side 14b does not have a taper, but is a surface that is orthogonal to the ABS 30-30. The absence of a taper on the MP leading side allows a more predictable MP shape even with variations in the placement of ABS that are caused by non-uniformity in the lapping process.

Figure 8A:
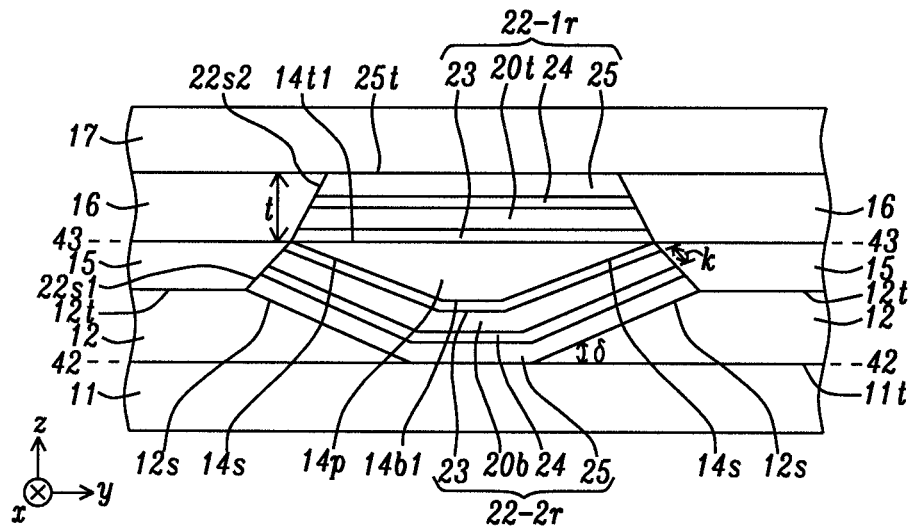
FIG. 8A is an ABS view depicting a second embodiment of the present disclosure where the stacking order of the FG device layers in FIG. 6A is reversed so that the spin polarization (SP) layer is the outer layer in each FG device.

Referring to FIG. 8A, a second embodiment of the present disclosure is illustrated that retains all of the structural features of the first embodiment except the ordering of the layers in each FG device is reversed. As a result, FG device 22-1r (also referred to as $FG_{LG}$) is formed in WG 16 and has a NML2/FGL/NML1/SP configuration wherein an inner NML2 23 is formed on MP trailing side 14t1, SP layer 25 contacts first TS 17, and FGL 20t is sandwiched between NML1 24 and NML2. FG device 22-2r (also known as $FG_{SGLG}$) has an inner NML2 23 adjoining each MP side 14s and MP leading side 14b1, an outer SP layer 25 contacting an inner side 12s of SS 12 and LS top surface 11t, and FGL 20b sandwiched between NML1 24 and the inner NML2. FG device 22-1r has sides 22s2 that adjoin WG 16 above plane 43-43, and FG device 22-2r has sides 22s1 that contact gap layer 15 below plane 43-43. The second embodiment has all of the performance advantages previously described with respect to the first embodiment.

FGL 20t and FGL 20b in FG device 22-1r and 22-2r, respectively, have the same orientation for magnetizations 20m1 and 20m2, respectively, as depicted in FIG. 6B. In other words, FGL magnetization 20m1 is aligned essentially in the same direction as $H_{WG}$, FGL magnetization 20m2 proximate to SS 12 is aligned essentially in the same direction as $H_{SG}$, and FGL magnetization 20m2 proximate to LS 11 is in the direction of $H_{LG}$ in the absence of an applied current.

Figure 8B:
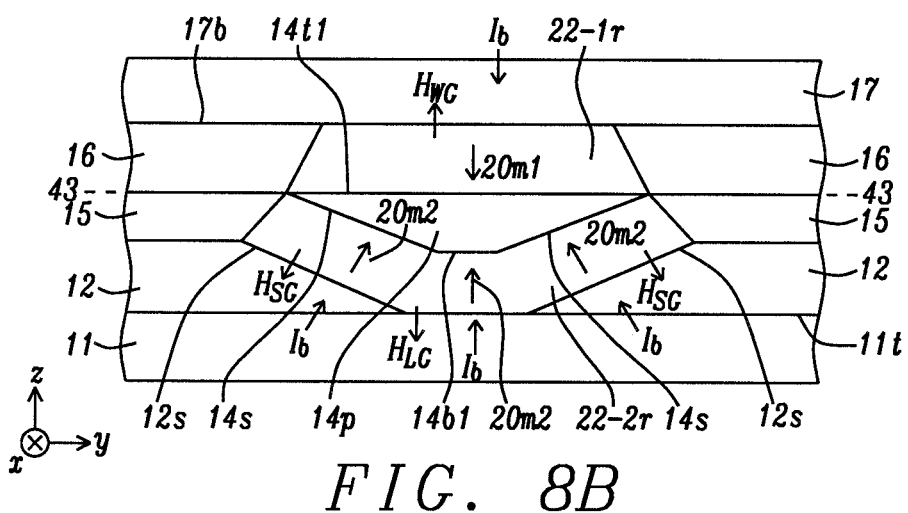
FIG. 8B shows the FGL magnetization in each FG device in FIG. 8A is switched to a direction pointing toward the MP tip after a current is applied across the gaps from each of the shields to the MP tip.

Referring to FIG. 8B, FGL magnetization 20m1 in FG device 22-1r flips to a direction substantially opposing $H_{WG}$ when a current $I_b$ of sufficient current density is applied from first TS 17 across FG device 22-1r and into MP tip 14p. Moreover, FGL magnetization 20m2 proximate to SS 12 in FG device 22-2r flips to a direction substantially opposing $H_{SG}$ when current $I_b$ is applied from each SS across each FG device 22-2r and into the MP tip at MP sides 14s. Similarly, FGL magnetization 20m2 proximate to LS 11 flips to a direction substantially opposing $H_{LG}$ when current $I_b$ is applied from the LS across FG device 22-2r and into the MP tip at MP leading side 14b1.

Figure 9A:
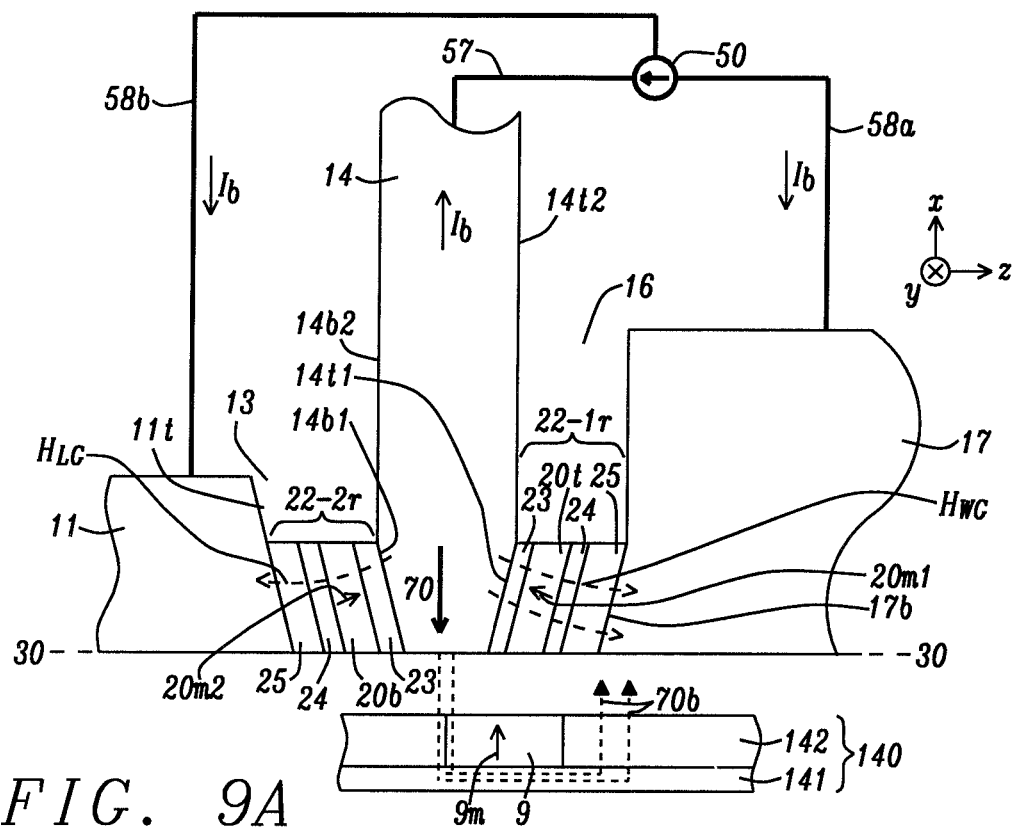
FIG. 9A is a down-track cross-sectional view of the PMR writer structure in FIG. 8B at a center plane that bisects the MP trailing and leading sides, and where each of the MP trailing side and leading side at the ABS is tapered.

FIG. 9A is a down-track cross-sectional view of the PMR writer structure in FIGS. 8A-8B and shows MP 14 with a tapered leading side 14b1 adjoining FG device 22-2r, and a tapered trailing side 14t1 contacting FG device 22-1r. Current $I_b$ is applied from source 50 through lead 58a to first TS 17 and across FG device 22-1r through MP trailing side 14t1, and returns from MP 14 to the source through lead 57. Current $I_b$ is also applied from LS 11 across FG device 22-2r and through MP leading side 14b1, and returns from the MP to the source through lead 57. It should be understood that leads (not shown) also apply $I_b$ from each SS (not shown) across a portion of FG device 22-2r to a MP side. As a result, FGL magnetization 20m1 switches to a direction opposing $H_{WG}$ and FGL magnetization 20m2 switches to a direction opposing $H_{LG}$ thereby enhancing MP write field 70. There is improved uniformity in FG device layers compared with prior art schemes so that the current density required to flip FGL magnetizations is more reproducible from one PMR writer to the next. Furthermore, the MP write field is more reproducible since the MP shape and volume are more tightly controlled.

Figure 9B:
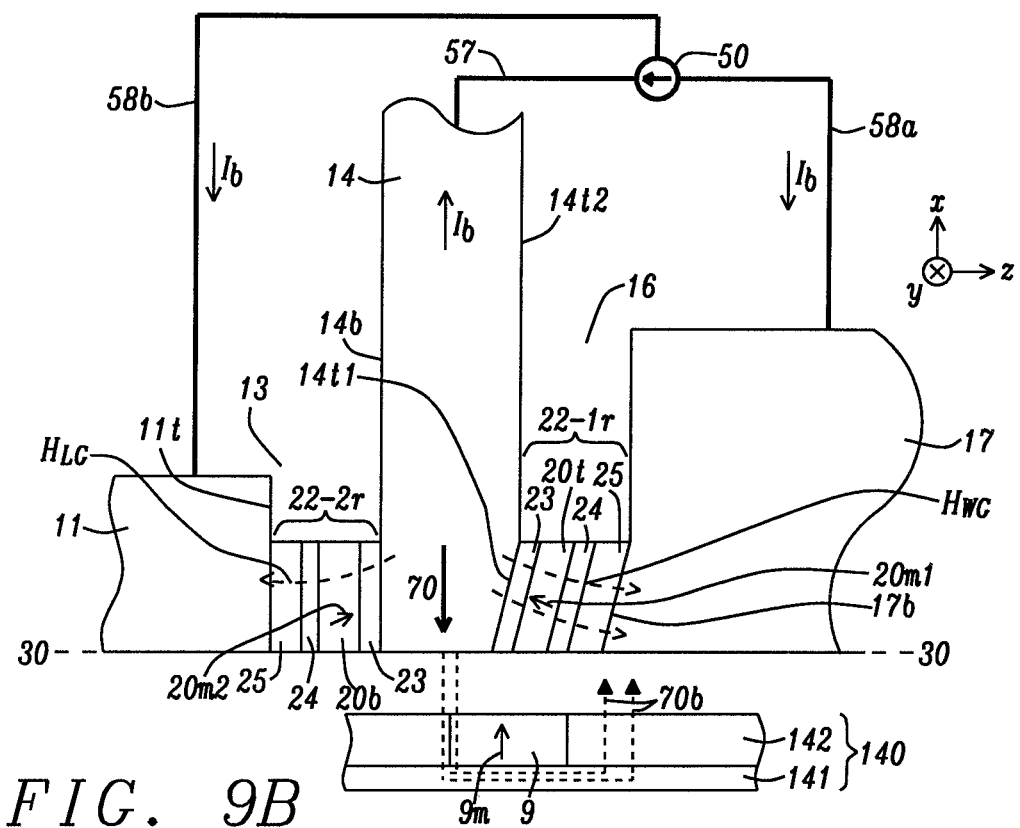
FIG. 9B is an alternative embodiment to the PMR writer structure in FIG. 9A wherein the MP leading side is orthogonal to the ABS while the MP trailing side at the ABS is tapered.

An alternative embodiment is depicted in FIG. 9B and retains all the features of the PMR writer structure in FIG. 9A except the MP leading side 14b is orthogonal to the ABS 30-30 rather than tapered. Again, the absence of a taper on the MP leading side enables a more predictable MP shape even with variations caused by non-uniformity in the lapping process at the end of the PMR writer fabrication.

Figure 10A:
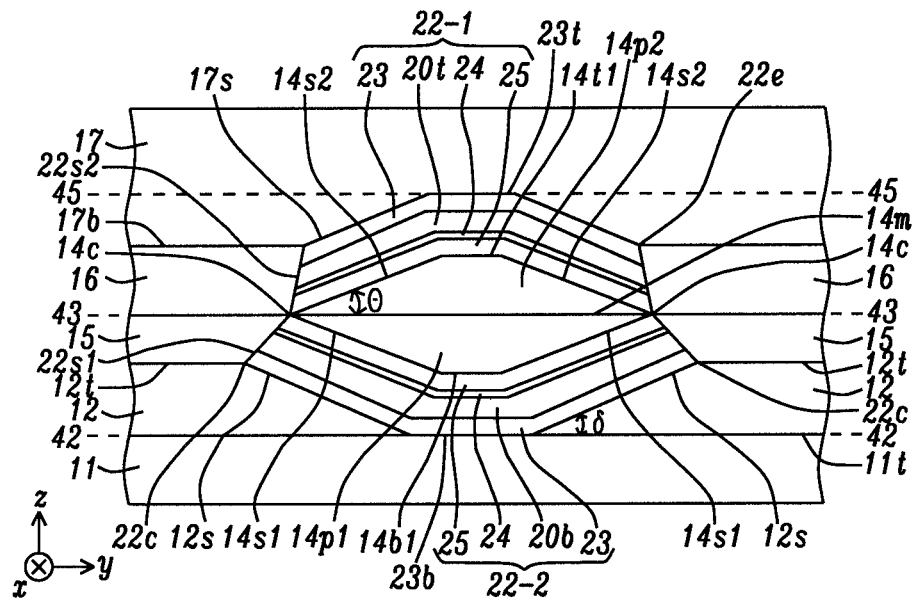
FIG. 10A is an ABS view according to a third embodiment of the present disclosure where all the features of the first embodiment are retained except the MP tip is modified to include an upper MP tip with an inverted trapezoid shape, and the overlying first FG device conforms to the upper MP tip top surface and is non-planar.

Referring to FIG. 10A, a third embodiment of the present disclosure is illustrated where the MP shape in the first embodiment is modified to include an upper MP tip 14p2 on the lower MP tip 14p1 (formerly MP tip 14p below plane 43-43 in FIG. 6A). The MP tip now has an irregular hexagonal shape at the ABS where the upper MP tip has two sides 14s2 each extending from a MP corner 14c to MP trailing side 14t1. The lower MP tip has two sides 14s1 each extending from a MP corner to MP leading side 14b1. Thus, the upper MP tip adjoins the lower MP tip on lower MP tip top surface 14m at plane 43-43, and between MP corners 14c. The increased MP tip volume enables the write field magnitude to be substantially maintained when compared with state of the art PMR writers having a trapezoidal MP tip shape and a gap angle >60 degrees.

Although the shape and structural features of the second FG device 22-2 are retained from the first embodiment, the first FG device 22-1 no longer has planar layers. Instead, each of the first FG device layers conforms to the shape of the upper MP tip top surface. SP layer 25, NML1 24, FGL 20t, and NML2 23 are sequentially formed on upper MP tip sides 14s2 and MP trailing side 14t1. Since angle θ formed by the intersection of an upper MP tip portion side with lower MP tip top surface 14m at plane 43-43 is preferably between 15 degrees and 45 degrees, each of the layers in FG device 22-2 maintains a uniform thickness. In the exemplary embodiment, FG device 22-1 has a side 22s2 with a bottom end that connects with a top end of side 22s1 of FG device 22-2 at each MP corner 14c. A top end 22e of each side 22s2 contacts TS bottom surface 17b, and a bottom end 22c of each side 22s1 contacts SS top surface 12t at plane 43-43. The uppermost side 23t of FG device 22-1 is at plane 45-45, which is parallel to plane 43-43 and comprises MP trailing side 14t1.

Figure 10B:
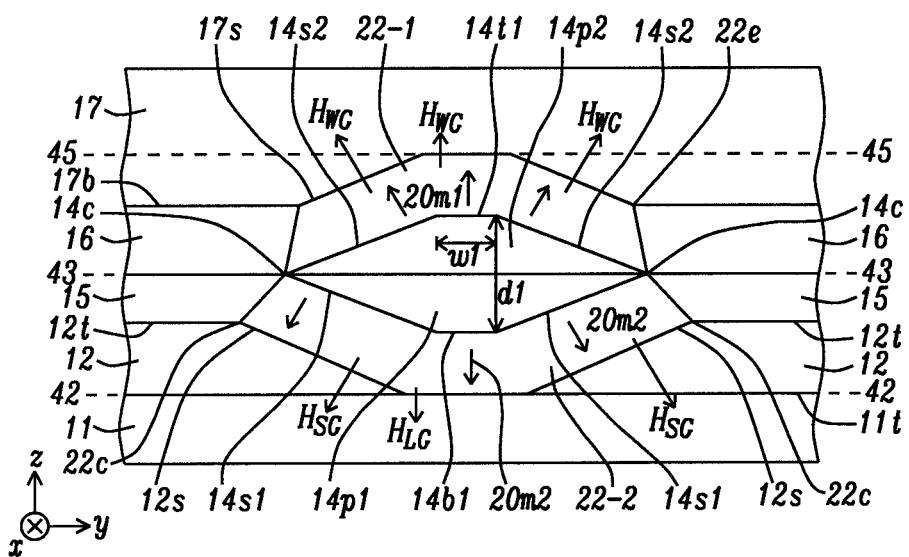
FIG. 10B is an ABS view of the PMR writer structure in FIG. 10A showing a FGL magnetization in each FG device in the absence of an applied current.

Referring to FIG. 10B, individual layers in each FG device are not shown in order to more clearly depict gap flux fields $H_{WG}$, $H_{SG}$, and $H_{LG}$, and to show that FGL 20*t* in FG device 22-1 has magnetization 20*m*1 substantially parallel to $H_{WG}$ proximate to each TS bottom side 17*s* and uppermost NML2 surface 23*t* in the absence of an applied current across FG device 22-1. Magnetization 20*m*2 in FGL 20*b* in FG device 22-2 was described previously with respect to the first embodiment. MP tip trailing side 14*t*1 has width w1 also known as the MP tip top width, and MP thickness at the ABS is increased from d in the previous embodiments to d1 in the third embodiment.

Figure 10C:
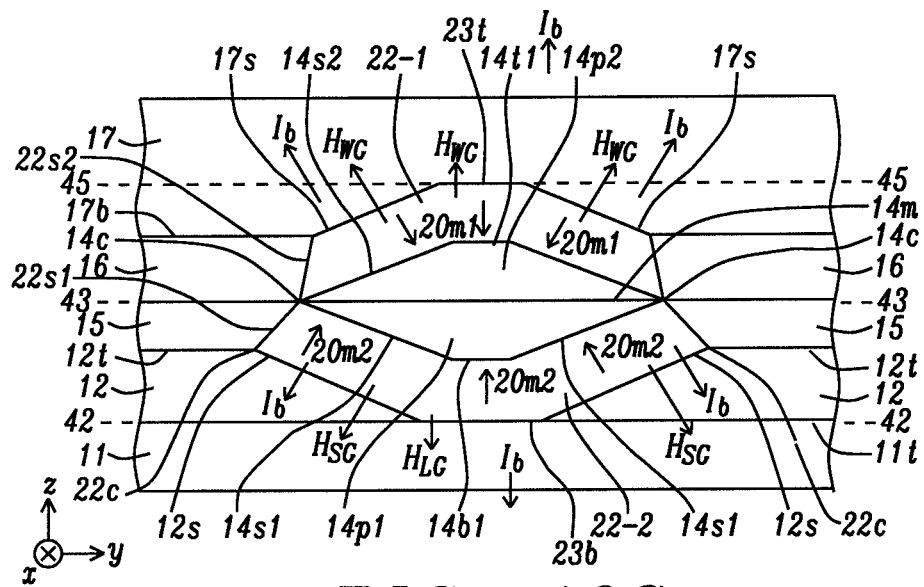
FIG. 10C shows the FGL magnetization in each FG device is switched after a current is applied across gaps from the MP tip to the surrounding shields.

In FIG. 10C, when a current $I_b$ of sufficient current density is applied from upper MP tip 14*p*2 across FG device 22-1 to first TS 17, and from the lower MP tip 14*p*1 across FG device 22-2 to SS 12 and LS 11, then magnetization 20*m*1 flips to a direction substantially opposing $H_{WG}$, and magnetization 20*m*2 flips to a direction substantially opposing $H_{SG}$ and $H_{LG}$ as a result of spin torque from SP layer 25 that is applied to FGL 20*t* and FGL 20*b*, respectively.

Figure 11:
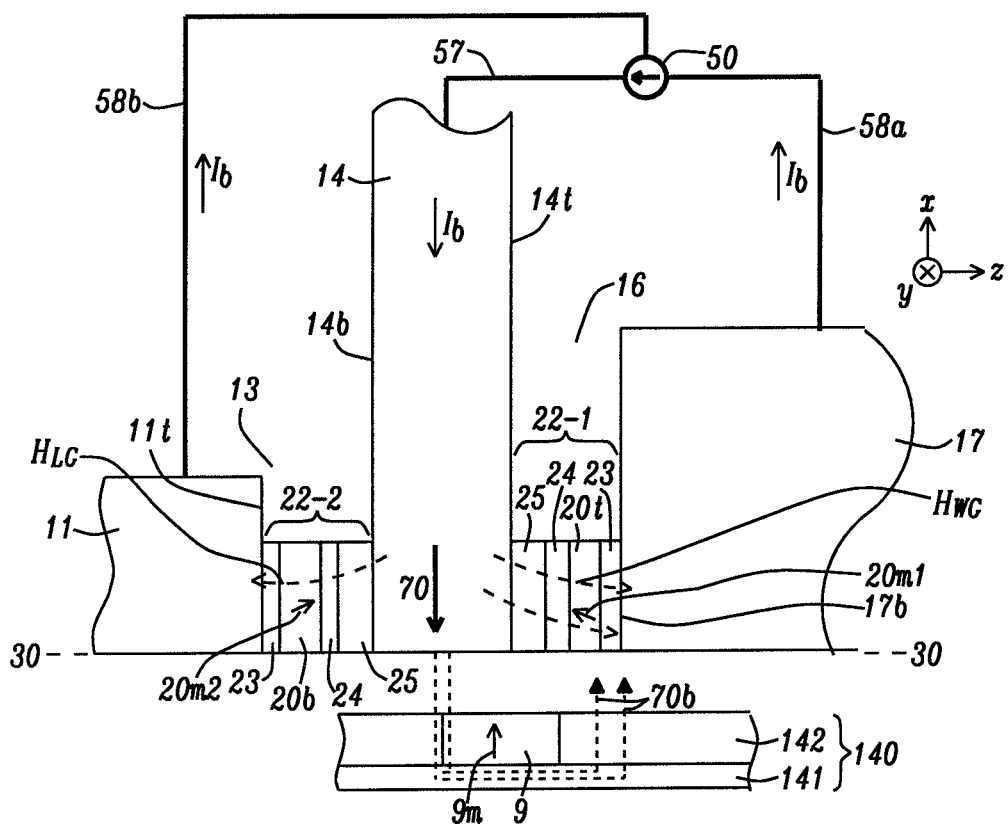
FIG. 11 is down-track cross-sectional view of the PMR writer structure in FIG. 10C wherein both of the MP leading and trailing sides are orthogonal to the ABS according to an embodiment of the present disclosure.

With regard to the PMR writer and FG device structure of the third embodiment, the present disclosure anticipates that a down-track cross-sectional view may be depicted as indicated in FIG. 7A where both of the MP trailing side 14*t*1 and MP leading side 14*b*1 are tapered at ABS 30-30. In other embodiments, the MP trailing side is tapered but the MP leading side 14*b* is orthogonal to the ABS as shown in FIG. 7B. According to another embodiment of the present disclosure depicted in FIG. 11, both of the MP trailing side 14*t* and MP leading side 14*b* in the MP tip shape of the third embodiment are orthogonal to the ABS. Accordingly, the MP tip shape and MP tip dimensions are less sensitive to variations caused by a subsequent lapping process than in the previous embodiments. The path of applied current $I_b$ through lead 57 to MP 14 and return through leads 58*a*, 58*b* to source 50 is maintained from the first embodiment.

Figure 12A:
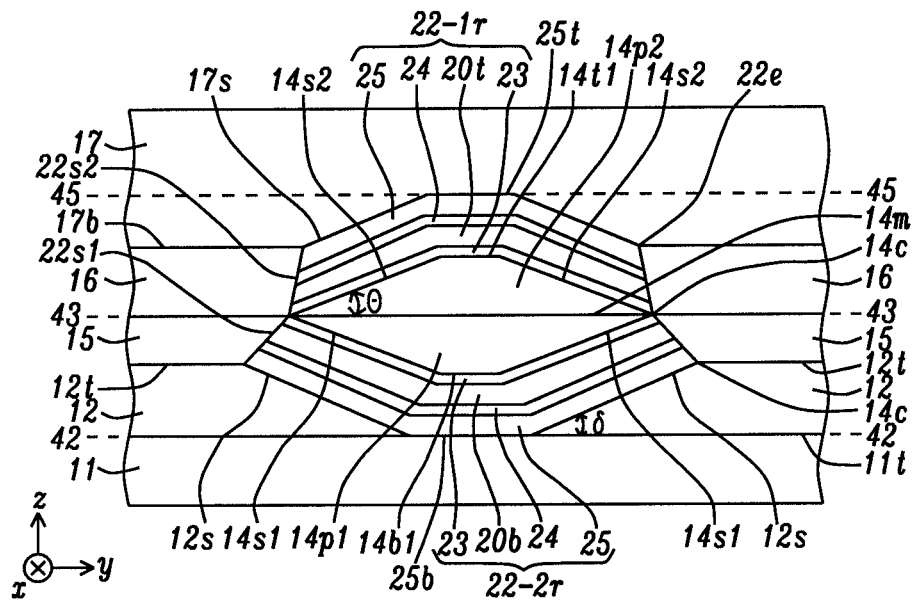
FIG. 12A is an ABS view depicting a fourth embodiment of the present disclosure where the stacking order of the FG device layers in FIG. 10A is reversed so that the SP layer is the outer layer in each FG device.

In FIG. 12A, a fourth embodiment of the present disclosure is illustrated that retains all of the structural features of the third embodiment except the ordering of the layers in each FG device is reversed. As a result, FG device 22-1*r* is formed in WG 16 and has a NML2/FGL/NML1/SP configuration wherein an inner NML2 23 is formed on upper MP tip sides 14*s*2 and on MP trailing side 14*t*1, SP layer 25 contacts first TS 17, and FGL 20*t* is sandwiched between NML1 24 and NML2. FG device 22-2*r* has an inner NML2 23 adjoining each lower MP tip side 14*s*1 and MP leading side 14*b*1, an outer SP layer 25 contacting an inner side 12*s* of SS 12 and LS top surface 11*t*, and FGL 20*b* sandwiched between NML1 24 and the inner NML2. The fourth embodiment has all of the performance advantages previously described with respect to the third embodiment.

Magnetizations 20*m*1 and 20*m*2 in FG devices 22-1*r* and 22-2*r*, respectively, are represented by the down-track cross-sectional view shown in FIG. 10B. In other words, the FGL magnetizations are always in the general direction of the respective gap flux field in the absence of an applied current and are independent of the stacking order in each FG device.

Figure 12B:
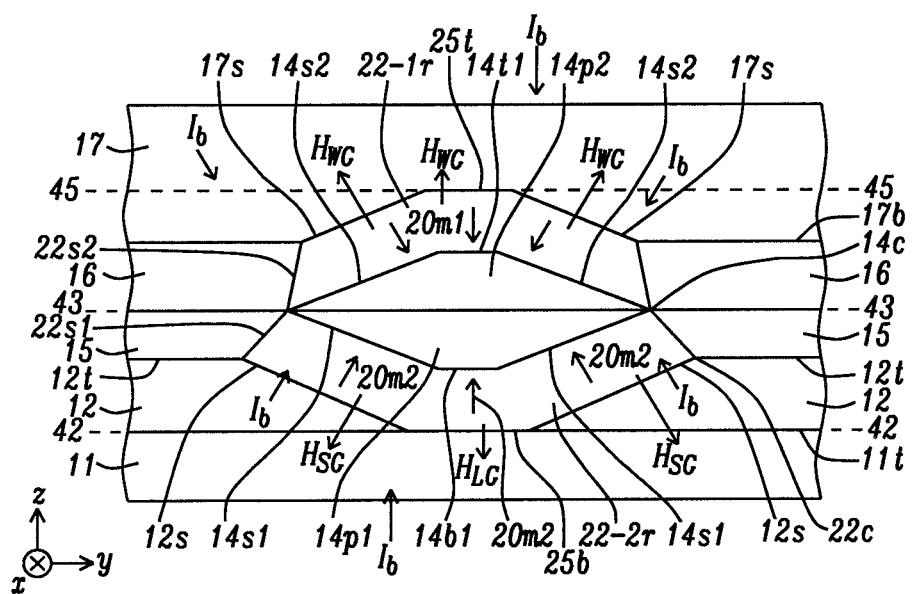
FIG. 12B shows the FGL magnetization in each FG device in FIG. 12A is switched to a direction pointing toward the MP tip after a current is applied across the gaps from each of the shields to the MP tip.

Referring to FIG. 12B, FGL magnetization 20*m*1 in FG device 22-1*r* flips to a direction substantially opposing $H_{WG}$ when a current $I_b$ of sufficient current density is applied from first TS 17 across top surface 25*t* of FG device 22-1*r* and TS sides 17*s* into upper MP tip 14*p*2. Likewise, FGL magnetization 20*m*2 proximate to SS 12 and LS 11 in FG device 22-2*r* flips to a direction substantially opposing $H_{SG}$ and $H_{LG}$, respectively, when current $I_b$ is applied from SS sides 12*s* and from LS 11 across FG device 22-2*r* into lower MP tip 14*p*1.

Figure 13:
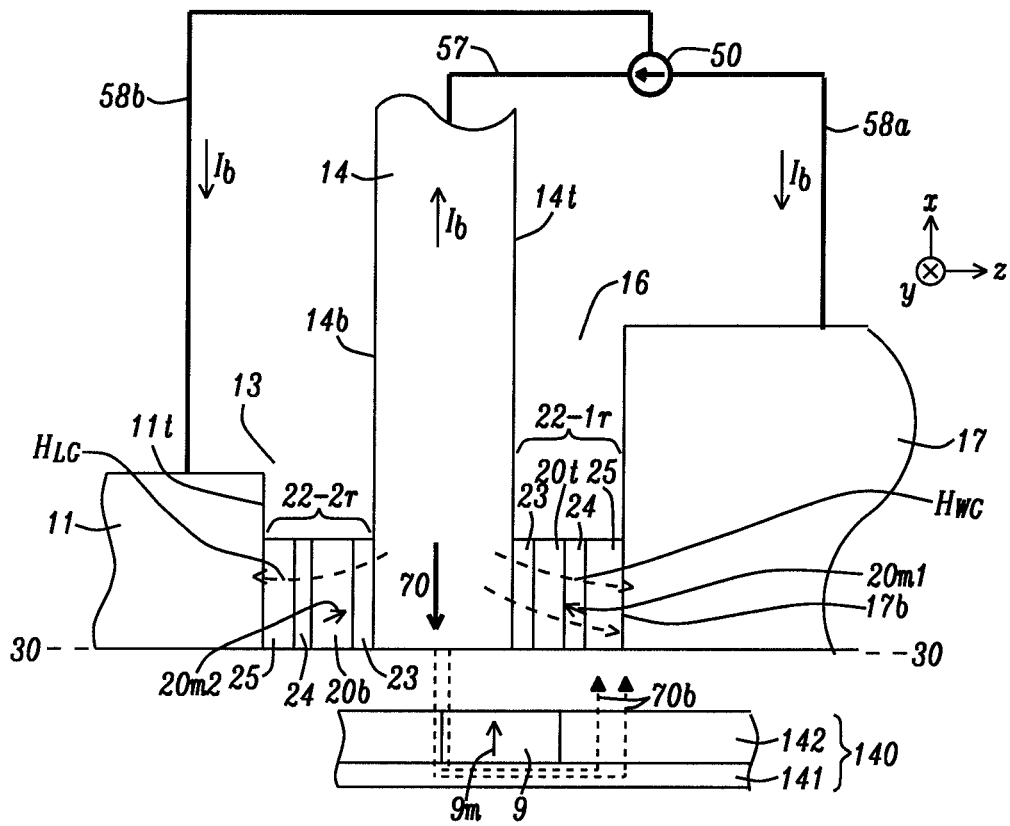
FIG. 13 is down-track cross-sectional view of the PMR writer structure in FIG. 12B wherein both of the MP leading and trailing sides are orthogonal to the ABS according to an embodiment of the present disclosure.

A down-track cross-sectional view of the fourth embodiment may be depicted as indicated in FIG. 9A where both of the MP trailing side 14*t*1 and MP leading side 14*b*1 are tapered. In other embodiments, the MP trailing side is tapered but the MP leading side 14*b* is orthogonal to the ABS 30-30 as shown in FIG. 9B. In yet another embodiment illustrated in FIG. 13, both of the MP trailing side 14*t* and MP leading side 14*b* are orthogonal to the ABS. The path of applied current $I_b$ through lead 58*a* to TS 17, and through lead 58*b* to LS 11, and the return through lead 57 to source 50 are maintained from the second embodiment.

Note that current density for $I_b$ that is needed to flip magnetization 20*m*1 may be different from that required to flip magnetization 20*m*2 depending on the thickness of each layer in FG devices 22-1, 22-2, respectively, (or in 22-1*r* and 22-2*r*) and the coercivity of FGL 20*t*, and FGL 20*b*. Each gap field $H_{WG}$, $H_{SG}$, and $H_{LG}$, and applied current $I_b$ are generally oriented orthogonal to MP trailing side 14*t*1, MP sides 14*s*, and MP leading side 14*b*1, respectively, in the first and second embodiments, and orthogonal to MP tip sides 14*s*1, 14*s*2, MP leading side 14*b*1 and MP trailing side 14*t*1 in the third and fourth embodiments.

In order for the FG devices to have acceptable reliability, the magnitude of current $I_b$ must be maintained as low as possible since excessive current may cause degradation of one or more layers in the FG devices due to electromigration and/or excessive local heating. In embodiments described herein, each FG device has a backside at a height from the ABS that is about the throat height of the respective shield, or of a NMC layer when a non-magnetic conductive layer replaces a SS or LS. A smaller FG device height could also be used in cases when the throat height of the shield, or of the NMC layer (that is used to replace one or both of the SS and LS) is larger than 50 nm.

Figure 14:
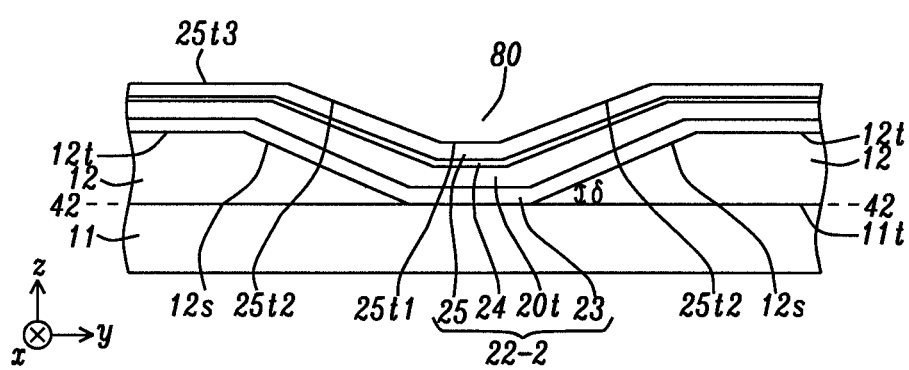
FIGS. 14-16 are ABS views showing a sequence of steps for forming a FG device on the SS sides and a LS top surface, and then forming a bottom MP tip on the FG device according to an embodiment of the present disclosure.

The present disclosure also encompasses a method of fabricating a PMR writer structure wherein a FG device is formed in each of the gaps surrounding the MP tip, and where the side gap angle δ formed between each SS inner side 12*s* and LS top surface 11*t* is from 15 degrees to 45 degrees. From a perspective at the eventual ABS in FIG. 14, SS 12 has an opening 80 formed by inner sides 12*s* and a portion of LS top surface 11*t* at plane 42-42. Thereafter, NML2 23, FGL 20*b*, NML1 24, and SP layer 25 (FG device 22-2 layers) are sequentially deposited by a sputter deposition method, for example, and form conformal layers on SS top surface 12*t*, SS inner sides, and on LS top surface 11*t* to partially fill opening 80. The SP layer top surface is comprised of a horizontal center section 25*t*1 above the LS top surface at the bottom of the opening, a sloped section 25*t*2 that is essentially parallel to SS sides 12*s*, and a horizontal outer section 25*t*3 above SS top surface 12*t* on each side of the opening.

Figure 15:
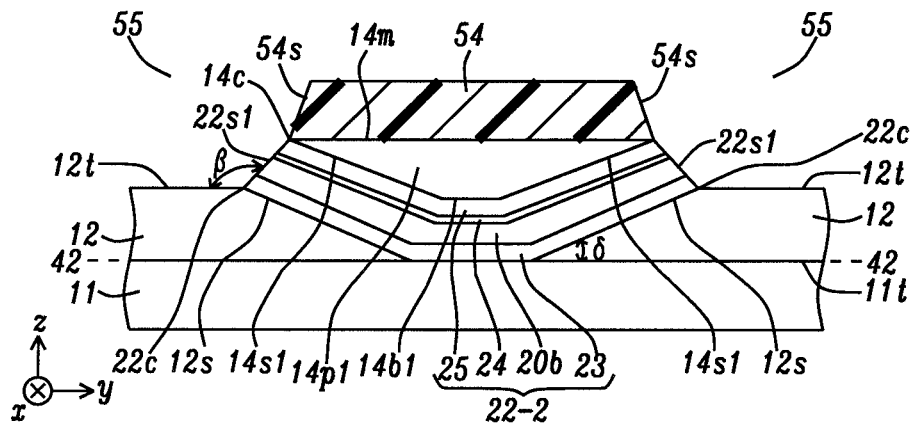

Referring to FIG. 15 that relates to a process of fabricating the MP and FG device structure of the third embodiment, the MP layer including lower MP tip 14*p*1 is deposited on SP layer top surfaces 25*t*1-25*t*3, and fills opening 80. Then, a first photoresist layer is coated on the lower MP tip and on SP layer top surface 25*t*3 (not shown). The first photoresist layer is patternwise exposed and developed with a conventional photolithography process to form photoresist mask 54 with sides 54*s*. An angled ion beam etch (IBE) that stops on SS top surface 12*t* may be employed to form sides 22*s*1 and opening 55 on each side of FG device 22-2 where each side 22*s*1 preferably forms an angle β>90 degrees with respect to SS top surface 12*t*. The resulting sides 54*s* of the photoresist mask will also be sloped because of the IBE. Each FG device side 22*s*1 extends from a top end at MP tip corner 14*c* (at one end of lower MP tip top surface 14*m*) to a bottom end 22*c* at SS top surface 12*t*.

Figure 16:
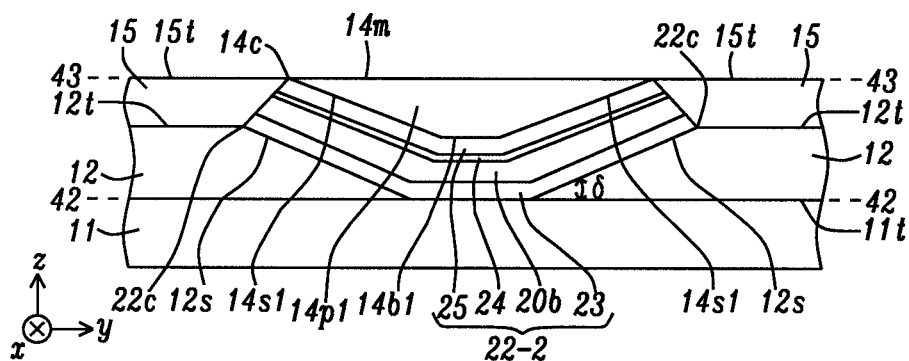

FIG. 16 depicts the partially formed PMR writer structure in FIG. 15 after gap layer 15 is deposited on FG device sides 22s1 and on SS top surfaces 12t. A chemical mechanical polish (CMP) process may be used to remove the photoresist mask 54 above lower MP tip 14p1 and form plane 43-43 comprised of the lower MP tip top surface 14m and gap layer top surface 15t on each side of the lower MP tip. Note that FG device 22-1 that was described in the first embodiment (FIG. 6A) may be formed at this point on the lower MP tip using a method previously disclosed in related Pat. No. 10,424,326.

Figure 17:
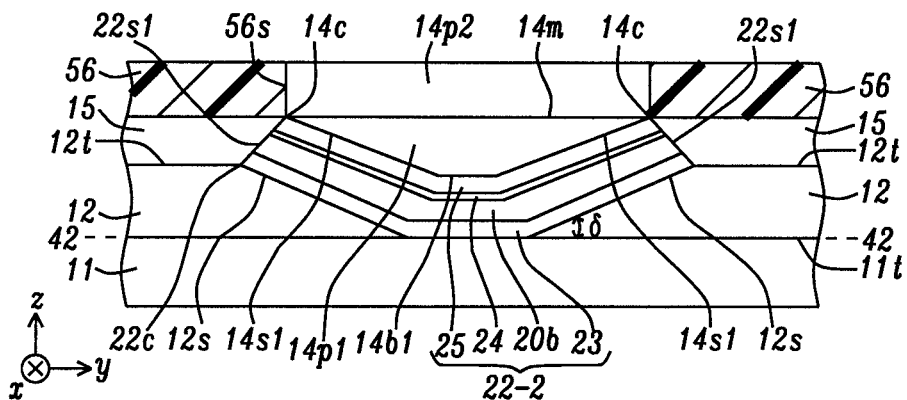
FIGS. 17-20 are ABS views depicting a sequence of steps of forming a top MP tip on the bottom MP tip in FIG. 16, and then forming a FG device on the top MP tip according to an embodiment of the present disclosure.

Referring to FIG. 17, a second photoresist is coated on lower MP tip top surface 14m and on gap layer 15, and is then patternwise exposed and developed to form photoresist mask 56 having inner sides 56s that form an opening (not shown), which exposes the lower MP tip top surface, and each inner side preferably has a bottom end that connects with a MP corner 14c. Thereafter, upper MP tip 14p2 is deposited on the lower MP tip 14p1 to fill the opening.

Figure 18:
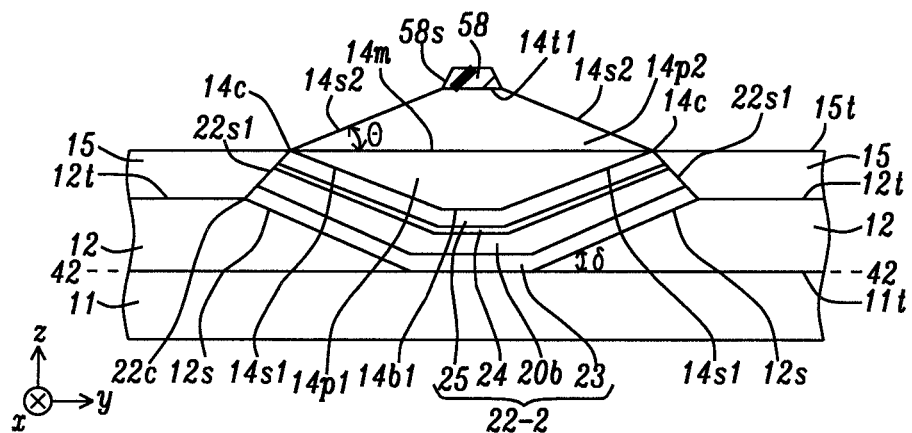

FIG. 18 depicts the partially formed PMR writer structure in FIG. 17 after a third photoresist is coated on upper MP tip 14p2, and is then patternwise exposed and developed to form photoresist mask 58 with sides 58s. Another angled IBE is performed to generate upper MP tip tapered sides 14s2 between each end of the upper MP tip top surface (trailing side) 14t1 and a MP corner 14c. Each tapered side 14s2 forms an angle θ preferably between 15 degrees and 45 degrees with lower MP tip top surface 14m at plane 43-43. The cross-track width of top surface 14t1 is considered the MP tip top width that was described earlier.

Figure 19:
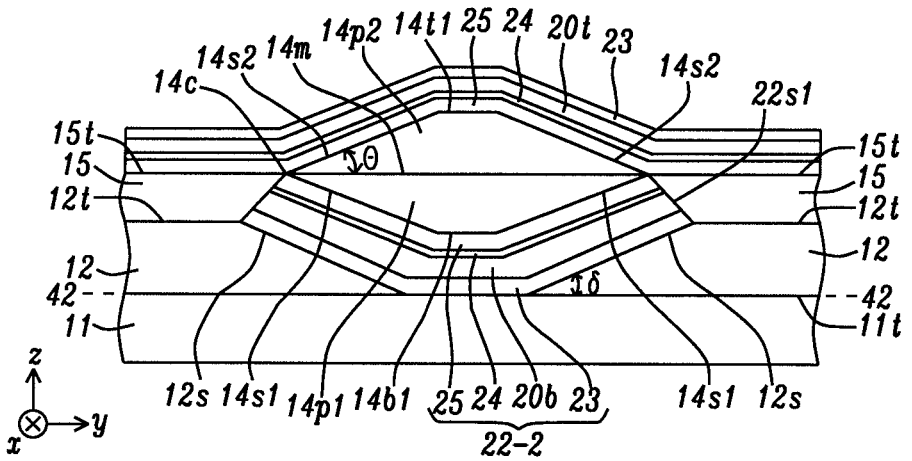

Thereafter, in FIG. 19, the third photoresist mask is removed with a conventional method, and SP layer 25, NML 24, FGL 20t, and NML2 23 that will eventually form FG device 22-1 are sequentially deposited on gap layer top surface 15t, and on upper MP tip sides 14s2 and top surface 14t1. Because upper MP tip sides 14s2 form an angle θ described previously that is between 15 degrees and 45 degrees, each of the aforementioned FG device layers are conformal to the shape of the upper MP tip sides and top surface, and have an essentially uniform thickness.

Figure 20:
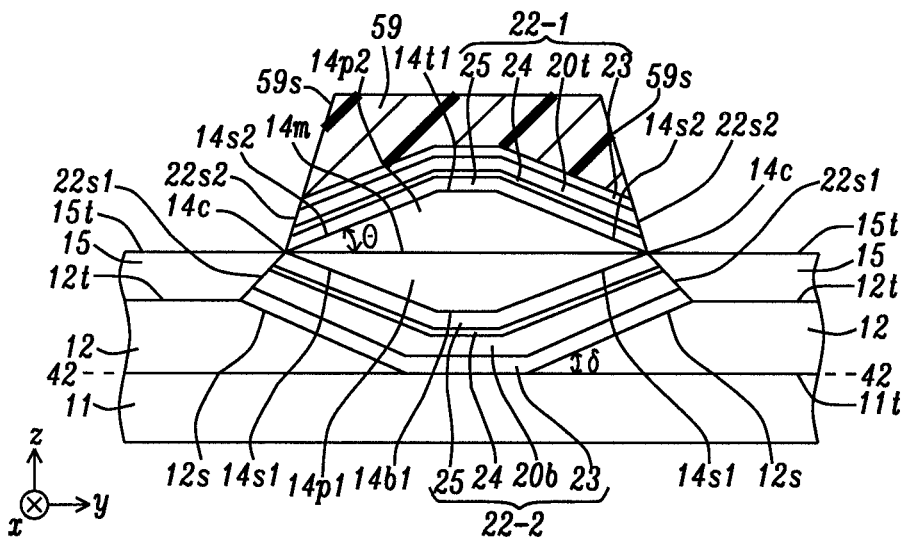

In FIG. 20, a fourth photoresist layer is coated on the uppermost NML2 23, and is then patternwise exposed and developed to yield photoresist mask 59 having sides 59s. An IBE or reactive ion etch process is performed to remove exposed portions of the FG 22-1 device layers and stop on gap layer top surface 15t. Preferably, each of the resulting FG 22-1 device sides 22s2 have a bottom end at a MP corner 14c and proximate to a top end of FG 22-2 device side 22s1.

Figure 21:
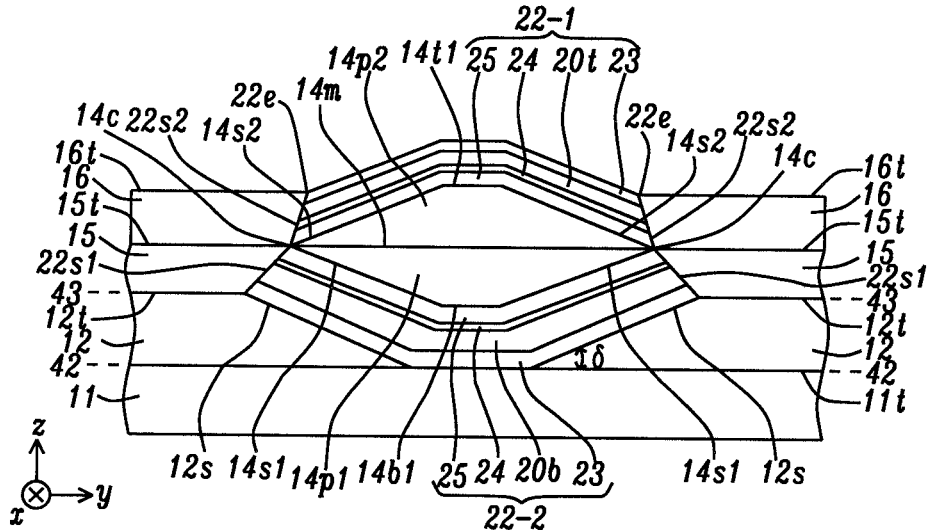
FIGS. 21-22 are ABS views showing a sequence of steps of forming a write gap adjacent to the upper FG device in FIG. 20, and then forming a trailing shield structure on the upper FG device and on the write gap according to an embodiment of the present disclosure.

Referring to FIG. 21, WG 16 with top surface 16t is deposited on gap layer top surface 15t and the photoresist mask is removed. The WG preferably contacts each side 22s2 of FG device 22-1 between MP corner 14c and an upper end 22e.

Figure 22:
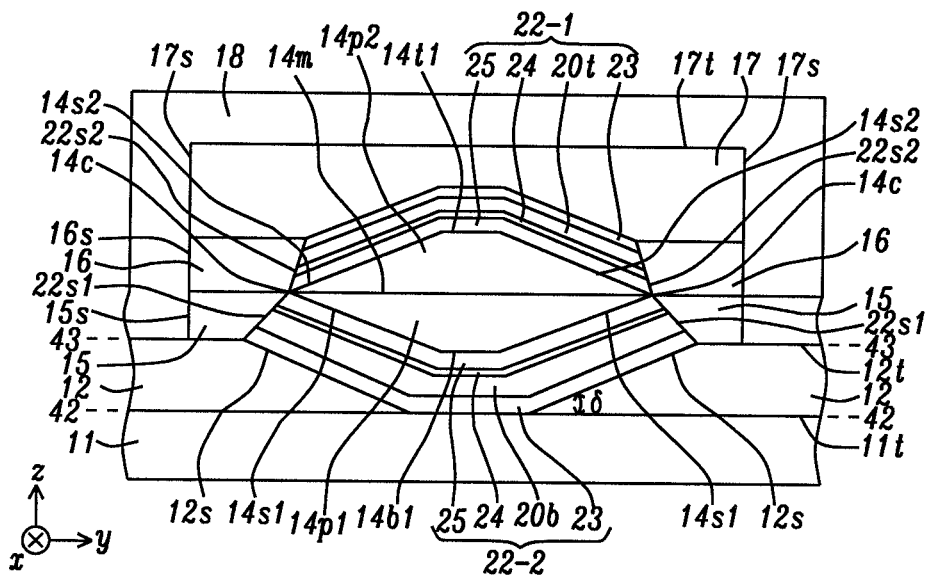

Referring to FIG. 22, first TS 17 is deposited on FG device 22-1 shown in FIG. 21. Next, a photoresist (not shown) is coated on the first TS and then patternwise exposed and developed to uncover outer portions of first TS top surface 17t. The photoresist pattern is transferred through unprotected portions of the first TS, WG 16, and gap layer 15 with an IBE or RIE process that stops on SS top surface 12t. Accordingly, first TS sides 17s, WG sides 16s, and gap layer sides 15s are coplanar and formed on each side of the MP tip comprised of upper MP tip 14t2 and lower MP tip 14t1. Second TS 18 is then deposited on the first TS and exposed portions of SS top surface. Thereafter, a conventional sequence of steps is performed to form a backside on the first and second TS, and overlying layers in the write head before a lapping process is employed to generate an ABS 30-30 as shown in FIG. 4.

While the present disclosure has been particularly shown and described with reference to, the preferred embodiments thereof, it will be understood by those skilled in the art that various changes in form and details may be made without departing from the spirit and scope of this disclosure.

We claim:

1. A perpendicular magnetic recording (PMR) writer, comprising:
   (a) a main pole (MP) having a pole tip with a leading side and a trailing side, and two sides connecting the leading and trailing sides at an air bearing surface (ABS), wherein the leading side adjoins a lead gap (LG), and the trailing side at the ABS has a track width between two MP tip corners, and is formed on a first plane that is orthogonal to the ABS;
   (b) a side gap (SG) adjoining each of the two MP sides and formed on an inner side shield (SS) side wherein each inner SS side forms a side gap angle δ where δ is from 15-45 degrees with respect to a second plane comprising a top surface of a leading shield (LS) and formed parallel to the first plane;
   (c) a first flux guiding (FG) device that is formed on the MP tip trailing side and in a write gap (WG), and a second FG device formed on the LS top surface in the LG and on the inner SS side in each SG, and wherein the first and second FG devices comprise a first flux guiding layer (FGL1) and second flux guiding layer (FGL2), respectively, and are configured so that a FGL1 magnetization flips to a direction substantially opposing a flux field in the WG, and a FGL2 magnetization in the LG and in each SG flips to a direction substantially opposing a flux field in the LG and in each SG, respectively, when a current ($I_b$) of sufficient current density is applied across the first and second FG devices so that reluctance is increased in each of the WG, SG, and LG thereby enhancing a write field from the MP tip on a magnetic medium; and
   (d) a trailing shield structure comprising a first trailing shield (TS) on the first FG device and on portions of the WG adjoining the first FG device.

2. The PMR writer of claim 1 wherein one or both of the MP tip leading side and MP tip trailing side are tapered at the ABS.

3. The PMR writer of claim 1 wherein the first FG device has a first spin polarization (SP) layer, a first spin preserving layer (SPL), FGL1, and a first non-spin preserving layer sequentially formed on the MP tip trailing side, and wherein the second FG device has a second non-spin preserving layer, FGL2, a second SPL, and a second SP layer sequentially formed on each inner SS side and the LS top surface, and wherein the second SP layer contacts each on two MP tip sides and the MP tip leading side.

4. The PMR writer of claim 3 wherein the $I_b$ is applied from the MP tip trailing side across the first FG device to the first TS, and is applied from the two MP tip sides and MP tip leading side across the second FG device to the SS inner sides and to the LS, respectively.

5. The PMR writer of claim 1 wherein the first FG device has a first non-spin preserving layer, FGL1, a first spin preserving layer (SPL), and a first spin polarization (SP) layer sequentially formed on the MP tip trailing side, and wherein the second FG device has a second SP layer, a second SPL, FGL2, and a second non-spin preserving layer sequentially formed on each SS inner side and the LS top surface, and wherein the second non-spin preserving layer contacts each of the two MP tip sides and the MP tip leading side.

6. The PMR writer of claim 5 wherein the $I_b$ is applied from the first TS across the first FG device to the MP tip trailing side, and is applied from each of the SS inner sides and from the LS top surface across the second FG device to the two MP tip sides and to the MP tip leading side, respectively.

7. The PMR writer of claim 1 wherein each of the FGL1 and FGL2 is a single layer or multilayer comprised of one or more of $Ni_xFe_{100-x}$, $Co_yFe_{100-y}$, $Co_zNi_{100-z}$, or alloys thereof with B where each of x, y, and z is from 0 to 100 atomic %, or is a laminate that is $(Co/Ni)_n$, $(CoFe/Ni)_n$, $(Fe/Pt)_n$, and $(Fe/Pd)_n$ where n is a lamination number.

8. The PMR writer of claim 3 wherein the first and second SPL are one of Cu, Ag, Au, Cr, and Al, and the first and second non-spin preserving layers are one of Ta, Ru, W, Pt, and Ti.

9. The PMR writer of claim 5 wherein the first and second SPL are one of Cu, Ag, Au, Cr, and Al, and the first and second non-spin preserving layers are one of Ta, Ru, W, Pt, and Ti.

10. The PMR writer of claim 1 wherein the first FG device has two sides each with a bottom end at a MP tip corner, and wherein the second FG device has two sides each with a top end at a MP tip corner.

11. A head gimbal assembly (HGA), comprising:
 (a) the PMR writer of claim 1; and
 (b) a suspension that elastically supports the PMR writer, wherein the suspension has a flexure to which the PMR writer is joined, a load beam with one end connected to the flexure, and a base plate connected to the other end of the load beam.

12. A magnetic recording apparatus, comprising:
 (a) the HGA of claim 11;
 (b) a magnetic recording medium positioned opposite to a slider on which the PMR writer is formed;
 (c) a spindle motor that rotates and drives the magnetic recording medium; and
 (d) a device that supports the slider, and that positions the slider relative to the magnetic recording medium.

* * * * *